US012695759B2

(12) United States Patent
Ramachandran et al.

(10) Patent No.: US 12,695,759 B2
(45) Date of Patent: Jul. 28, 2026

(54) SYSTEMS AND METHODS FOR AUTOMATED CLOUD PROVISIONING

(71) Applicant: Elevance Health, Inc., Indianapolis, IN (US)

(72) Inventors: Karthik Ramachandran, Prosper, TX (US); Jason Pichardo, Stafford, VA (US); Lee Graves, Goochland, VA (US); Val Ezike, Collegeville, PA (US); Barry Martin, Bradenton, FL (US); Mamadou Bah, Indianapolis, IN (US); Wesley Carlton, Indianapolis, IN (US)

(73) Assignee: Elevance Health, Inc., Indianapolis, IN (US)

( * ) Notice: Subject to any disclaimer, the term of this patent is extended or adjusted under 35 U.S.C. 154(b) by 98 days.

(21) Appl. No.: 18/926,164

(22) Filed: Oct. 24, 2024

(65) Prior Publication Data

US 2025/0055851 A1 Feb. 13, 2025

Related U.S. Application Data

(63) Continuation of application No. 17/816,641, filed on Aug. 1, 2022, now Pat. No. 12,132,737.

(60) Provisional application No. 63/228,530, filed on Aug. 2, 2021.

(51) Int. Cl.
*H04L 9/40* (2022.01)

(52) U.S. Cl.
CPC .......... *H04L 63/102* (2013.01); *H04L 63/105* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 10,798,084 | B1 * | 10/2020 | Rose | H04L 63/20 |
| 2023/0106025 | A1 | 4/2023 | Genchev et al. | |
| 2023/0109510 | A1 | 4/2023 | Polimera et al. | |
| 2024/0259416 | A1 * | 8/2024 | Miyake | G06F 21/552 |

* cited by examiner

*Primary Examiner* — Cai Y Chen

(57) ABSTRACT

A method is disclosed for automating creation of an account to access to a plurality of cloud based platforms, comprising receiving an intake request; determining whether the account is requested on a first cloud platform or a second cloud platform; determining whether an environment is requested; in response to a determination that an environment is requested, creating a created environment; in response to a determination that an environment is not requested, associating an existing environment with the account; in response to a determination that an environment is requested and a determination that the account is requested on the first cloud platform, creating network handlers; creating a workspace and a repository; creating vault secrets; in response to a determination that the account is requested on the first cloud platform, and tagging at least one resource associated with the account with a resource tag.

19 Claims, 19 Drawing Sheets

+ Application Details

App ID:
APM1000056

Barometer No:

Application Name:

Business Division:

Application Owner:

Application DL:

SNOW Assignment Group:

DR Tier:

OBA info

OBA Name:

OBA Code:

Cost Center:

IT Owning Org:

Data Output  Explain  Messages  Notifications

| olym_row_id | olym_uuid | olym_oba_code | app_code | app_apm | request_type |
|---|---|---|---|---|---|
| [PK] integer | character varying | character varying | character varying | character varying | character varying |
| 1 | | | | | |

Cloud Platform Services

Olympus - Request for approval

Greetings,

<Requester>                      has submitted a request for creating an AWS account(s) for the application Transition
Adapter - with Application code apm
                    <APM ID>
Your approval is required for us to process this request. You can review/approve/deny using the link below.

Landing Zone Application

On your approval, the following resources will be created:

- Distribution Lists for billing and operation related communications
- Silver, Gold and/or Platinum AWS accounts
- Terraform workspaces

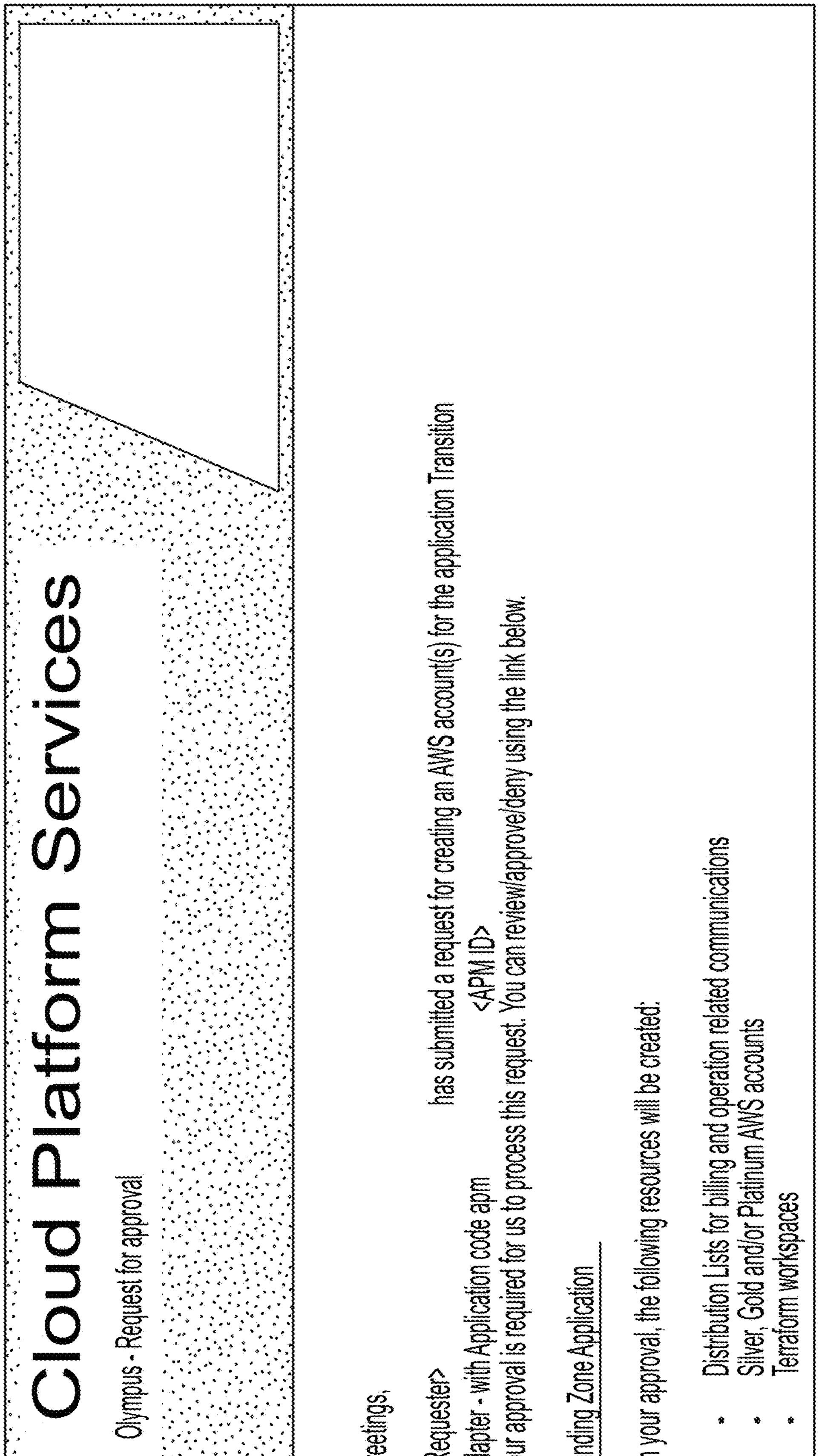

FIG. 12

SYSTEMS AND METHODS FOR AUTOMATED CLOUD PROVISIONING

CROSS-REFERENCE TO RELATED APPLICATIONS

This application is a continuation of and claims priority to U.S. patent application Ser. No. 17/816,641 filed Aug. 1, 2022 which claims the benefit of U.S. Provisional Patent Application No. 63/228,530, filed Aug. 2, 2021, the full disclosure of which is hereby incorporated by reference herein.

TECHNICAL FIELD

The disclosed implementations relate generally to account provisioning for digital access, more specifically to systems and methods for provisioning the use of hosting cloud services, including for software development.

BACKGROUND

Businesses often need to create and provide accounts to multiple cloud based platforms, to their employees and other workers, including commercial third party cloud based platforms in addition to any in-house platforms that may exist. For example, a business involved in developing software applications in a cloud environment require accounts to be provisioned for developers, so the development team can perform development activities and develop production applications. To provision such accounts is a manual, labor intensive process, with multiple actions that need to be performed, resulting in delay and re-work.

In accordance with processes known in the art, providing cloud account or workspace access may take as many as 6 weeks. An initial intake process may take 2 weeks, and account provisioning may take up to 4 weeks. The process lacks automation and is not streamlined. Accounts had to be provisioned manually, which results in mistakes and a lack of consistency. The current manual system restricts account or workspace scalability and involves lengthy manual provisioning. End user seeking accounts often have to raise multiple service requests involving hand-offs across multiple groups including cloud engagement, cloud operations, network infrastructure, network security, cloud security and enterprise encryption services, which also involved additional reviews with various manual steps. Manual intervention for account creation also results in project delays and repeated work. There are major dependencies on on-premise IT systems such as directory services that required manual provisioning that needed to be addressed as part of the overall automated cloud environment provisioning process. As such, there is a need for automated self-service capabilities for developers to provision cloud services.

SUMMARY

Accordingly, there is a need for an automated, integrated approach to provisioning and use of Cloud services that spans multiple Cloud Service Providers, to help teams, e.g. application development teams, adopt cloud for hosting their application.

In accordance with an embodiment of the present disclosure, The platform may profiles an application for development, e.g. based on information associated with a registration database, provisions foundational environment with prescriptive built-in intelligence (e.g., account structure, network, security, HA-DR, logging, monitoring, compliance and billing), and delivers workspace with catalog of pre-approved services. All of these tasks may be automated. Automation can lead to greatly reduced time between initiation of the process and its completion, which may in some embodiments be reduced from six weeks to two hours. Automation may also result in an improved experience for users requesting accounts and for professionals in charge of obtaining accounts. An automated process may also reduce labor by, e.g., the development team, which would allow the team to focus on development.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for account provisioning at a server device: receiving a new account request; reviewing the new account request; determining whether the new account request is approved; in response to a determination that the new account request is approved, automatically: create the new account, provision initial guardrails, create email distribution list, create active directory groups, configure network routing changes, generate encryption keys, upload encryption keys, generate multifactor authentication and security guardrails, update account metadata, review the new account, release the new account, and provision ports for connection to client devices. Other embodiments of this aspect include corresponding computer systems, apparatus, and computer programs recorded on one or more computer storage devices, each configured to perform the actions of the methods.

In another aspect, a system configured to perform any of the above methods is provided, according to some implementations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer implemented method for automating creation of an account to access to a plurality of cloud based platforms. The computer implemented method also includes receiving an intake request may include intake input data where the intake input data may include role data for the account. The method also includes receiving approval for the intake request. The method also includes determining from the intake input data whether the account is requested on a first cloud platform or a second cloud platform. The method also includes in response to a determination that an account is requested on the first cloud platform, creating a distribution list for notification related to the account on the first cloud platform. The method also includes determining from the intake input data whether an environment is requested. The method also includes in response to a determination that an environment is requested, creating a created environment on the first cloud platform or the second cloud platform. The method also includes in response to a determination that an environment is not requested, associating an existing environment with the account.

The method also includes in response to a determination that an environment is requested and a determination that the account is requested on the first cloud platform, creating network handlers, where the network handler may include a private domain name system hosted zone associated with a virtual private cloud. The method also includes in response to a determination that an environment is requested and a determination that the account is requested on the first cloud platform, configuring logging to be stored in a centralized logging account associated with the first cloud platform. The method also includes determining from the role data whether an existing active directory group exists relating to the role data. The method also includes in response to a determination that an active directory group exists for the role data, associating the account with the existing active directory group. The method also includes in response to a determination that an active directory does not exist for the role data, creating a created active directory group for the account according to the role data and associating the account with the created active directory group. The method also includes associating the existing active directory group or the created active directory group, that is associated with the account, with the existing environment or the created environment that is associated with the account. The method also includes creating a workspace and a repository associated with the account. The method also includes creating vault secrets associated with the account. The method also includes in response to a determination that the account is requested on the first cloud platform, tagging at least one resource associated with the account with a resource tag. The method also includes creating and sending a notification that the account has been created. Other embodiments of this aspect include corresponding computer systems, apparatus, and computer programs recorded on one or more computer storage devices, each configured to perform the actions of the methods.

Implementations may include one or more of the following features. The method where the first cloud based platform is amazon web services, and where the second cloud based platform is google cloud platform. Creating the created environment on the first cloud platform may include creating an amazon web services account using account vending machine, the method may include triggering account vending machine using an event bus rule. The intake input data may include data indicating that the account is one of a standard account, a sandbox account, and a custom account. Creating the created environment on the second cloud platform may include creating a google cloud platform project, where creating a google cloud platform further may include launching a vending process that combines scripts, credentials and variables to create the google cloud platform project. The variables include information about what accounts will have access to allocated resources. Receiving an intake request occurs via a portal.

The intake request may include an application id to be associated with a standard account, the method may include looking up the application id in an application replication database to determine whether the application id is valid. The intake input data may include data relating to whether a new workspace is requested. Creating network handlers further may include associating the virtual private cloud with a shared service account, where the shared service account is configured to propagate domain name system information for use by the virtual private cloud. The step of associating the existing active directory group or the created active directory group, that is associated with the account, with the existing environment or the created environment that is associated with the account further may include provisioning security guardrails. The security guardrails are provided by the first cloud platform or the second cloud platform and are stored in a code repository. The request to change security guardrails does not include a reference to the account. The method may include the steps of opening a session with a single sign on server; retrieving a security guardrail policy from the code repository; associating the session with the account; and creating a role for the account by attaching security guardrails to the account and creating a trust relationship with the single sign on server. The step of creating vault secrets further may include the substeps of initialize a vault object; creating a secrets engine; initialize the secrets engine using the vault object; creating a static single sign on credential relating to the account; creating a trust relationship between the single sign on credential and the account; and storing a key and value pair representing the single sign on credential in a vault. Implementations of the described techniques may include hardware, a method or process, or computer software on a computer-accessible medium.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 12 in an example of the format of a message in accordance with an embodiment of the present disclosure.

DESCRIPTION OF IMPLEMENTATIONS

Figure 1A:
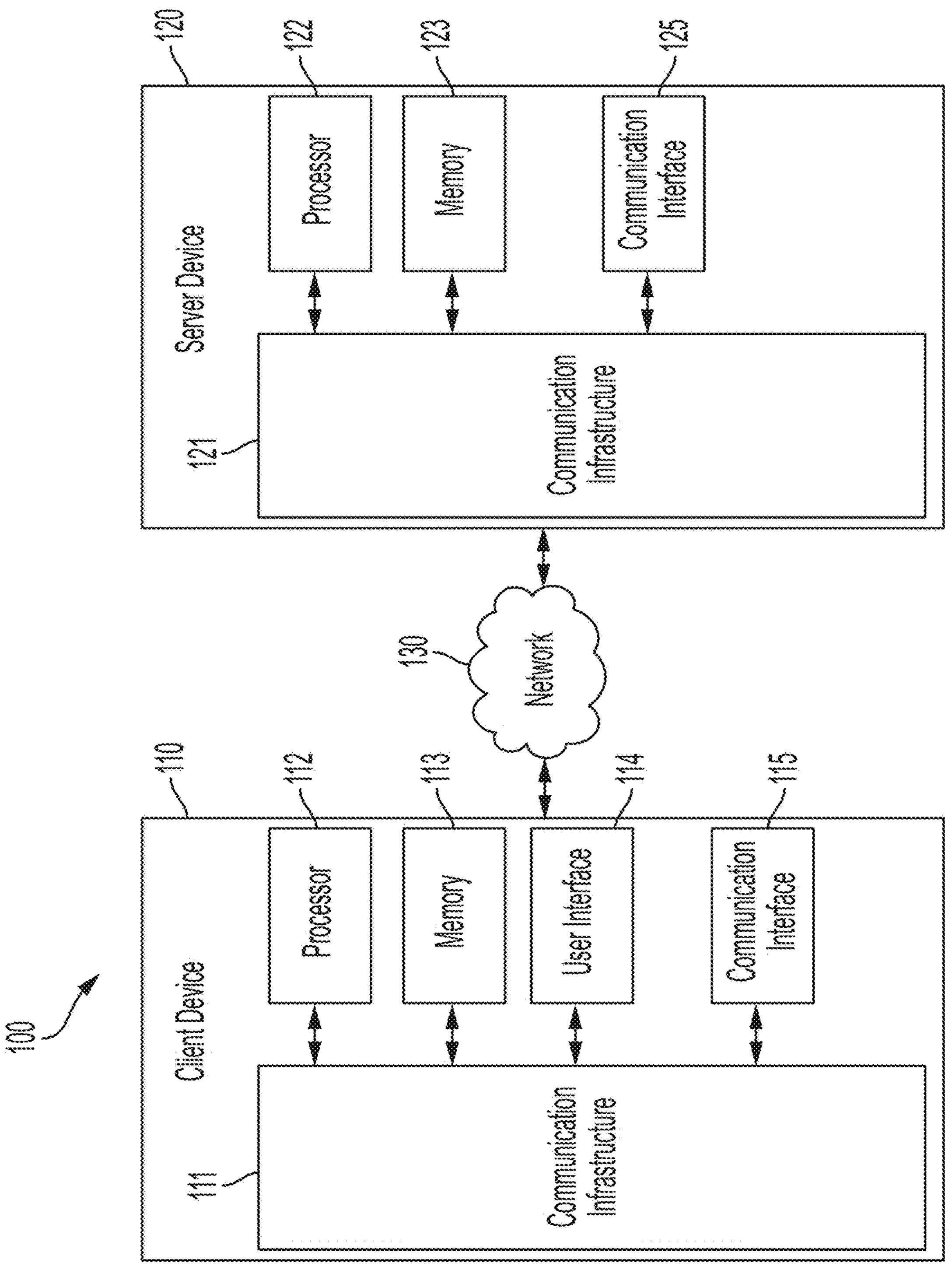
FIG. 1A is a block diagram of a system in accordance with an embodiment of the present disclosure.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

In some embodiments, the implements described herein include a Multi-Cloud Platform that provides an automated, integrated approach to provisioning and use of cloud services that spans multiple cloud service providers.

In some embodiments, implementations described herein help application teams to adopt cloud for hosting their application, The implementations may profile the application based on the information associated with the Anthems application registration database, provision foundational environment with prescriptive built-in intelligence (i.e., Account structure, network, security, HA-DR, logging, monitoring, compliance and billing), deliver workspace with catalog of pre-approved services.

In some embodiments, these tasks are automated and completed in ~2 hours with improved developer experience. Allows application team to focus on innovation and delivery of functionality to customers.

FIG. 1A shows a block diagram that illustrates a system 100 for providing an automated, integrated approach to provisioning and use of cloud services that spans multiple cloud service providers. While some example features are illustrated, various other features have not been illustrated for the sake of brevity and so as not to obscure pertinent aspects of the example aspects disclosed herein. To that end, in at least one aspect, the system 100 may include one or more computers or servers, non-transitory memory operable to store one or more computer programs and one or more processors to implement the one or more computer programs. For example, the system 100, shown in FIG. 1, may include client device 110, server device 120 and network 130.

Client device 110 may be a computing device for receiving inputs from a user (e.g., a member), requesting data from server device 120 via network 130 and/or displaying data from service device 120 at the request of a user. Examples of a client device 110 may include a smart phone, tablet or a personal computer, among others.

Server device 120 may be any computing device, including one or more software modules (e.g., a scoring module) for receiving and/or responding to requests for data from client device 110. Examples of data may include web page data, hypertext markup language (HTML), text, video, audio as a free form speech describing symptoms and conditions, picture, software, executable, interpretable, byte-code, and binary files. In some aspects, the server device 120 may be a plurality of computing devices that process the request from the client device 110. The server device 120 may be configured to process requests from other computing devices in parallel with the request from the client device 110.

In one aspect, server device 120 is a web server that hosts a website. Client device 110 may be configured to request provider recommendations from server device 120 based on a hypertext transfer protocol (HTTP). Server device 120 may respond to a provider recommendation request by sending provider recommendation data (e.g., an ordered list of providers) to client device 110. In one aspect, provider recommendation data may include web page data included on an HTML web page. While the server device 120 may be configured for HTTP/HTML requests and responses, as described in the exemplary aspect above, the system 100 is not limited to the use of HTML or HTTP, and that aspects of the present invention can be used with any computer communication language or network protocol suitable for the purposes of the described communications between client device 110 and server device 120.

Client device 110 may include communication infrastructure 111, processor 112, memory 113, user interface 114 and communication interface 115. Server device 120 may include communication infrastructure 121, processor 122, memory 123 and communication interface 125.

Processor 112 or processor 122 may be any type of processor, including but not limited to a special purpose digital signal processor. Processor 112 is connected to a communication infrastructure 111 (for example, a bus or network). Processor 112 is connected to a communication infrastructure 121 (for example, a bus or network). Various software implementations are described in terms of this exemplary computer system.

Memory 113 or memory 123 may include one or more of: random access memory (RAM), a hard disk drive and a removable storage drive, such as a floppy disk drive, a magnetic tape drive, or an optical disk drive, etc. The removable storage drive may read from and/or writes to a removable storage unit. The removable storage unit can be a floppy disk, a magnetic tape, an optical disk, etc., which is read by and written to a removable storage drive. Memory 113 and/or memory 123 may include a computer usable storage medium having stored therein computer software programs and/or data to perform any of the computing functions of client device 110 and/or server 120. Computer software programs (also called computer control logic), when executed, enable client device 110 and/or server 120 to implement aspects of the present invention as discussed herein. Accordingly, such computer software programs represent controllers of client device 110 and/or server 120. Memory 123 may include one or more data stores that store data such as web page data, software files or any other types of data files. Server device 120 may retrieve the data from memory 123 before transmitting to client device 110 via network 130. Memory 123 may include member characteristics, provider characteristics, member-provider interaction characteristics, feature bias weightings, member/provider bias weightings, and learnt weightings, among other described herein.

User interface 114 may be produced by a program that controls a display (not shown) of client device 110. User interface 114 may include one or more peripheral user interface components, such as a keyboard or a mouse. The user may use the peripheral user interface components to interact with client device 110. User interface 114 may receive user inputs, such as mouse inputs or keyboard inputs from the mouse or keyboard user interface components. User interface 114 may display data, such as web pages, on the display of client device 110 using a web browser. While the user interface 114 may be configured for displaying data using a web browser, as described in the exemplary aspect above, user interface 114 is not limited to displaying data using a web browser, and that aspects of the present invention may contemplate using other display devices or software suitable for the purposes of the displaying the data.

Communication interface 115 and/or communication interface 125 allow data to be transferred between client device 110 and server device 120 via network 130. Examples of communication interface 115 or communication interface 125 may include a modem, a network interface (such as an Ethernet card), a communication port, a Personal Computer Memory Card International Association (PCMCIA) slot and card, etc. Data transferred via communication interface 115 or communication interface 125 are in the form of signals, which may be electronic, electromagnetic, optical, or other signals capable of being transmitted or received by communication interface.

Network 130 connects client device 110 and server device 120 by carrying signals. Network 130 may be implemented using wire or cable, fiber optics, a phone line, a wireless link, a cellular phone link, a radio frequency link, or any other suitable communication channel. For instance, network 130 may be implemented using a combination of channels. Network 130 may be implemented as an intranet and/or an internet.

Figure 1B:
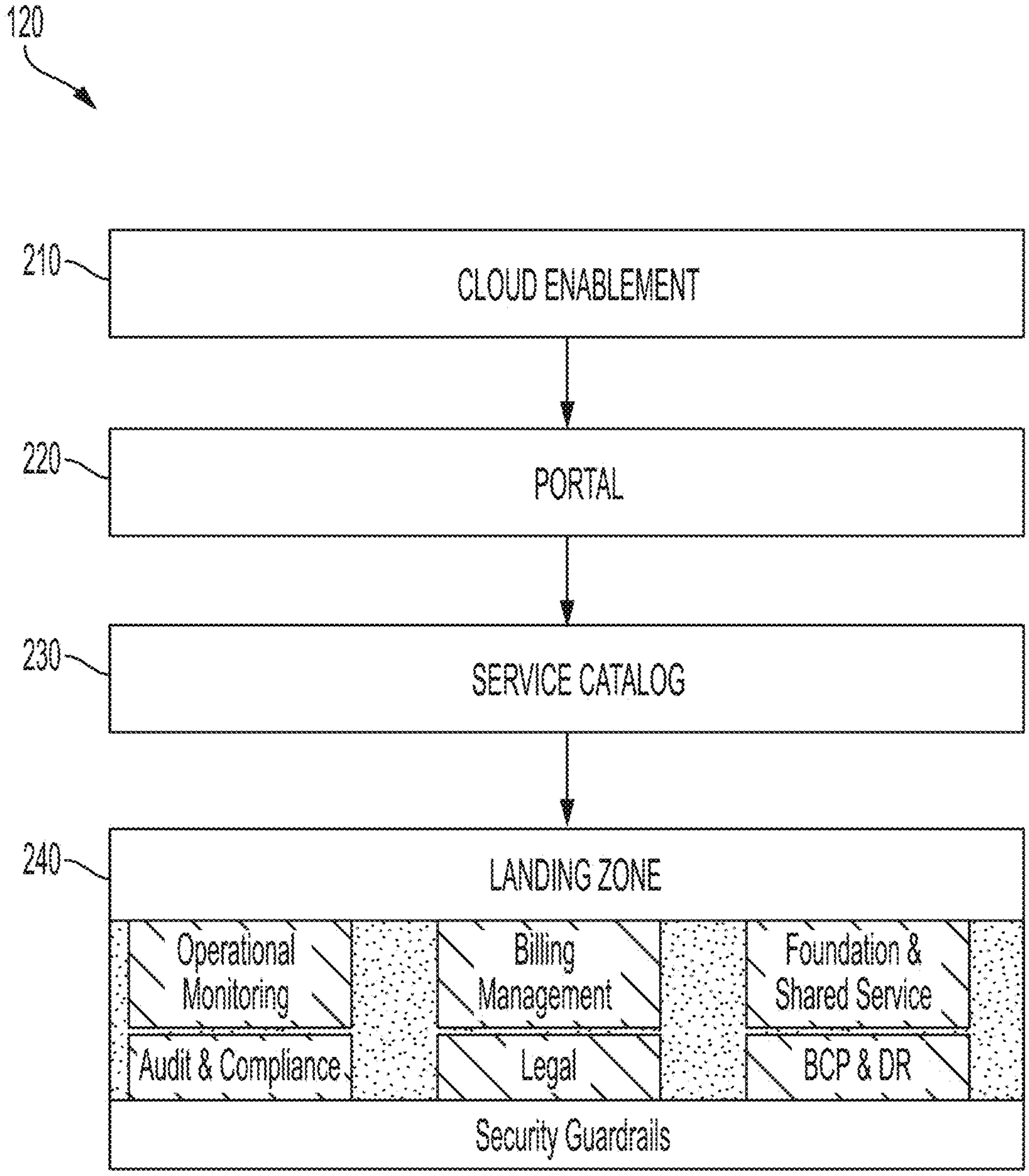
FIG. 1B is a conceptual block diagram of a server in accordance with an embodiment of the present disclosure.

FIG. 1B is a conceptual block diagram of the server device 120 of system 100 of FIG. 1A, in accordance with one embodiment of the present disclosure. Cloud Enablement module 210 processes and provides application on boarding with Business unit or application owner. In some embodiments, the process may begin with a self-service portal module 220 that may provide account creation and automation capabilities to enhance development experience. Users and others may can request accounts and workspace via the portal. The portal may then make available a Service Catalog module 230, which may provide one or more sets of secured and predefined environments, which can in some embodiments be tiered, e.g. using Bronze, Silver, Gold and Platinum "Menu" service. These tiers may correspond to sandbox, development, SIT and Production environments. Service Catalog Module 230 may provide account and workspace creation capability. Landing zone module 240 may then provide a secure flexible multi-account structure-based cloud and may present account categories in accordance with organizational best practices. For example, core components may include Foundation & Shared Services, Billing Management, Legal, Operational Monitoring, Audit & Compliance, Business continuity planning & Disaster Recovery, and Security Guardrails.

Figure 2:
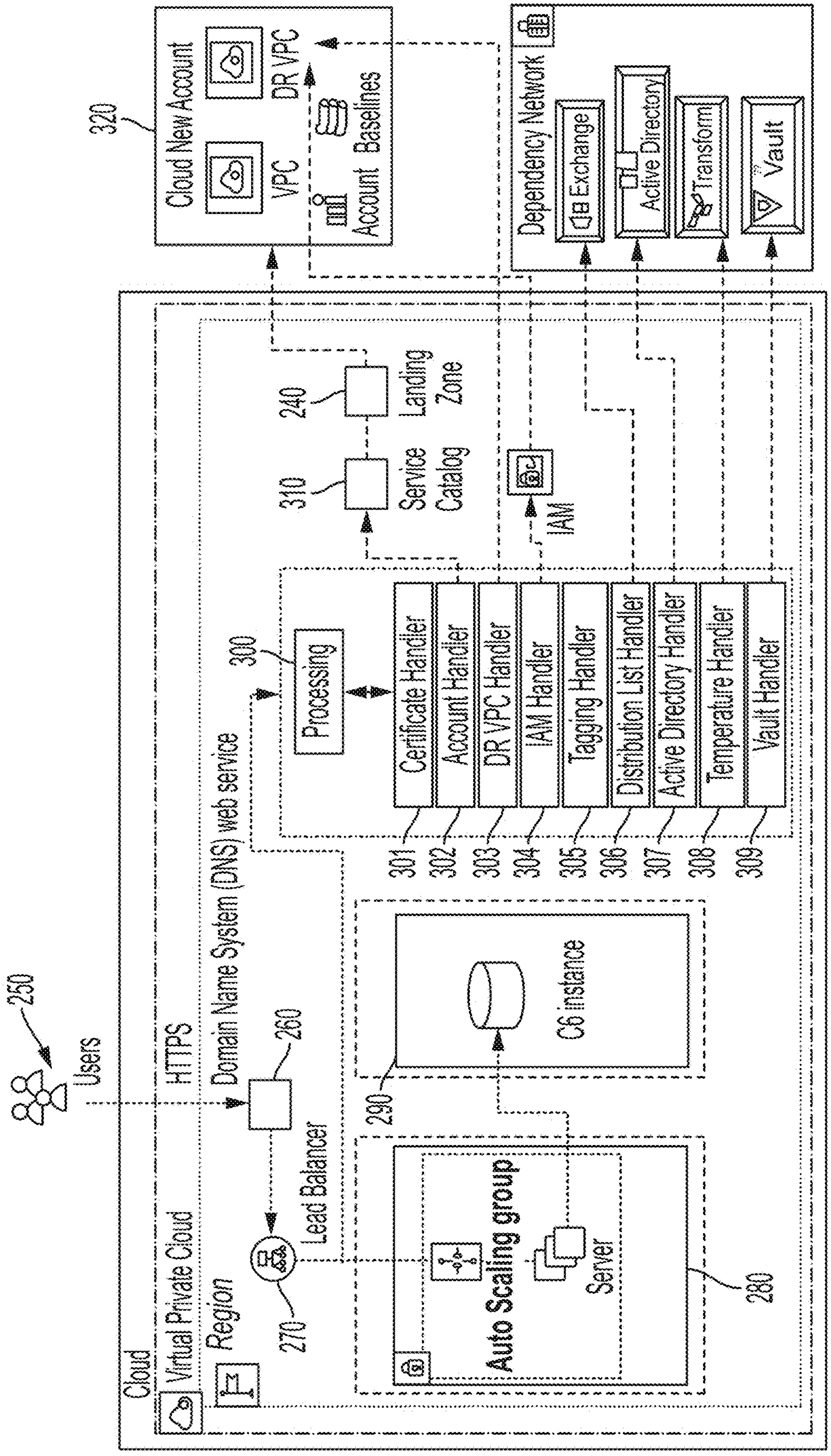
FIG. 2 is a conceptual representation of a system in in accordance with an embodiment of the present disclosure.

FIG. 2 shows an overview diagram of a system in accordance with one embodiment the present disclosure. One or more users 250 may request cloud account creation, e.g. of accounts in which application development, testing and production deployment activities can be performed. Domain Name System (DNS) web service 260 routes end users to Internet applications by translating names into the numeric IP addresses for servers. In some embodiments, traffic from DNS web service 260 may be passed to load balancer 270 which routes client requests across multiple servers 280 that are capable of fulfilling requests, to maximize speed and capacity utilization and avoid overworked servers that can negatively impact performance. If a server 280 goes down, load balancer 270 may redirect traffic to remaining online servers 280. When a new server 280 is added to the server group, load balancer 270 may automatically start to send requests to it.

Server 280 has a hosted web application interface for users to interact with. User interaction may include filling a form requesting provisioning of access and Cloud accounts. Database Instance 290 captures and maintains metadata and information from user interface that is running on server 280. Processing 300 involves multiple activities which may be required for or used in account and user access provisioning. Activities performed by processing 300 will be discussed in further detail below in reference to other figures. In certificate handler 301, one or more certificates required for access are generated. Certificate handler 301 provisions a way to generate one or more certificates. Account handler 302 creates Cloud accounts in accordance with organizational security and compliance requirements. DR VPC handler 303 creates Virtual private cloud for Disaster recovery needs. Disaster Recovery involves a set of policies, tools and procedures to enable the recovery or continuation of vital technology infrastructure and systems following a natural or human-induced disaster. Identity and Access Management (IAM) Handler 304 creates IAM roles on Cloud accounts to access cloud account and create infrastructure resources. Tagging Handler 305 tags infrastructure resources so they can be triaged and separated, e.g. based on which division or unit has requested access. Distribution List Handler 306 is used to Create, Read, Update, and Delete E-mail Distribution Lists internal to the organization, e.g. if new user accounts are added to or deleted from existing list. Active directory (AD) handler sub-component 307 creates AD groups, which may be used to grant developer's access to cloud accounts, which may include Amazon Web Services (AWS) accounts; workspaces, which may include Terraform workspaces; and secrets engine which may include a Vault secrets engine. Workspace handler 308 may be used for resource provisioning in cloud accounts. In workspace handler 308, workspaces are created which may be used by application teams for infrastructure deployments. Workspaces in some embodiments may be created using Terraform. Secrets Engine Handler 309 sets up and configures a secrets engine, both to store secrets and securely connect workspaces and cloud accounts. In some embodiments, the secrets engine may be implemented in Vault.

Service catalog 310 provides set of secured and predefined environments using a tier system such as Bronze/Silver/Gold and Platinum "Menu" service. These tiers may represent sandbox, development, SIT and Production environments. Service catalog 310 provides account and workspace creation capability. Service catalog 310 may have one or more scripts that create the cloud accounts and incorporate baseline security requirements in them. Landing zone 240 provides secure flexible multi-account structure-based cloud and best practices as described above. Finally, in the Cloud New account module 320, new accounts are provided to requesting users.

Figure 3:
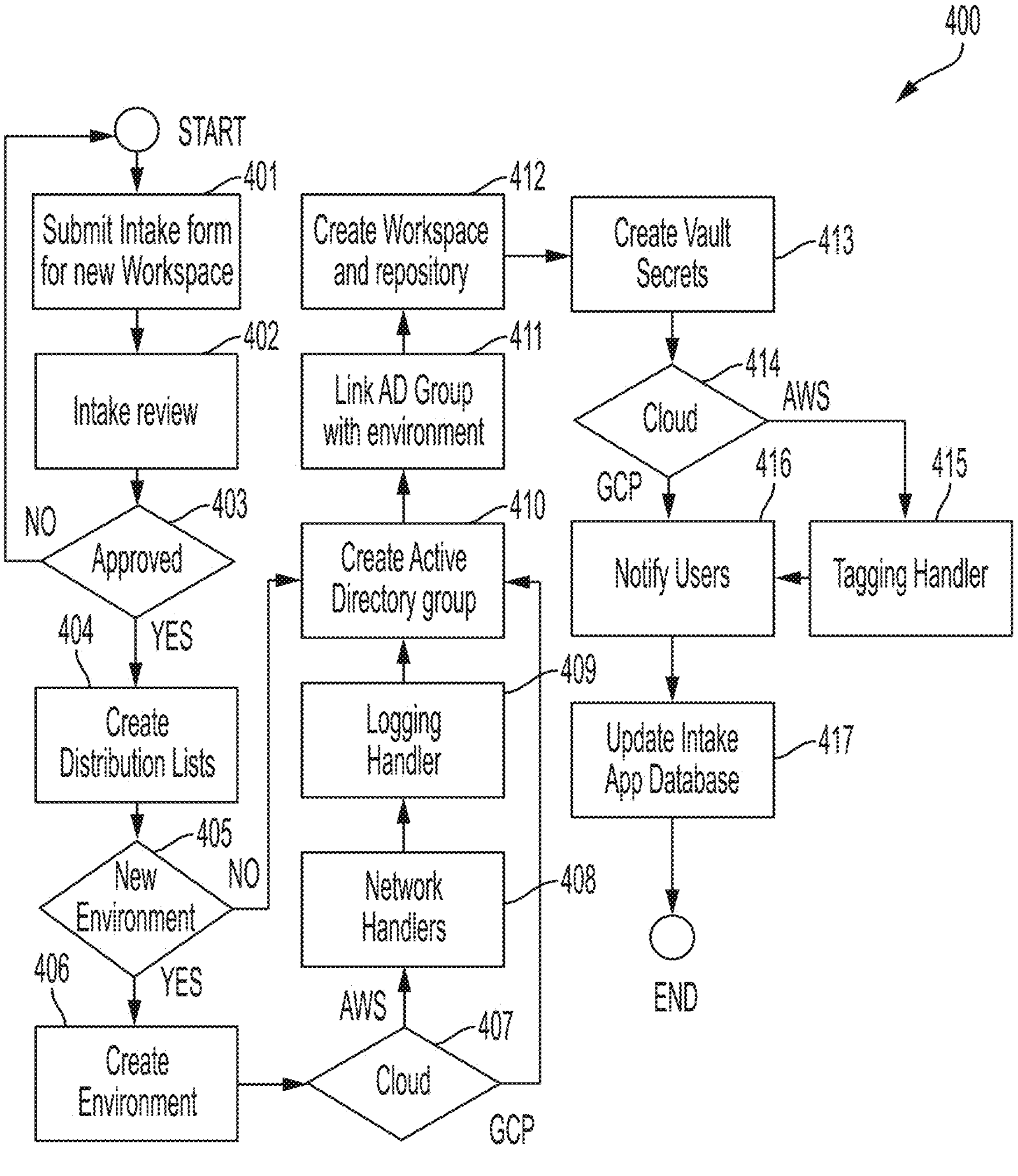
FIG. 3 is a flow diagram in accordance with an embodiment of the present disclosure.

Turning now to FIG. 3, a Flow Diagram of the Processes, Functions and Data Flows in accordance with one aspect of the present disclosure is shown. In one aspect, process 400 from an initial user request to final cloud account provisioning is automated and cloud vendor agnostic. Besides the Intake request and the approval process, all other steps on the account provisioning are done automatically. Process 400 of FIG. 3 can support cloud account creation on Amazon Web Services (AWS) and Google Cloud Platform (GCP) as cloud providers. However, it may be adapted to support accounts on other cloud providers.

The process 400 begins with receiving an intake request (401) comprising intake input data wherein the intake input data comprises role data for the account. The requester can submit an intake form using a portal, which may in some embodiments only be accessible inside a local network. In the case of cloud access for creating infrastructure applications, the portal may include a set of applications and services that streamline the creation of artifacts necessary for an application to have access to create infrastructure in a cloud environment. Intake input data may include information regarding the application. The goal of the process may be that, and at the end of the process, the appropriate accounts will have read access to a cloud environment console, write access to a bitbucket repository, and write access to workspaces, which themselves would have write access to the cloud environment.

In some aspects, there will be multiple options for types of accounts, which may depend on requirements and/or on already existing environments. Standard accounts, sandbox accounts, and custom requests may be accommodated. A Standard account form may be used to document and automate deployment of cloud environment requests. The filled out form may contain information necessary for creating the base Cloud accounts for application and environments access. The Standard account process may use information in an application database, which may contain details including application owner information. In one aspect, each Application may be tied to a person, an entity, a business unit, or some other unit designated as its owner. A Sandbox account form may be used for Sandbox-Disconnected accounts. These are a short-lived accounts with no connectivity to on-premises network, no peering to the other account. This may be required by applications for proof of concept. Custom requests may also be made if Standard account does not full fill application needs. Additionally, the intake form may also capture Data classification requirements, compliance needs and cost center information related to the account.

Figure 4:
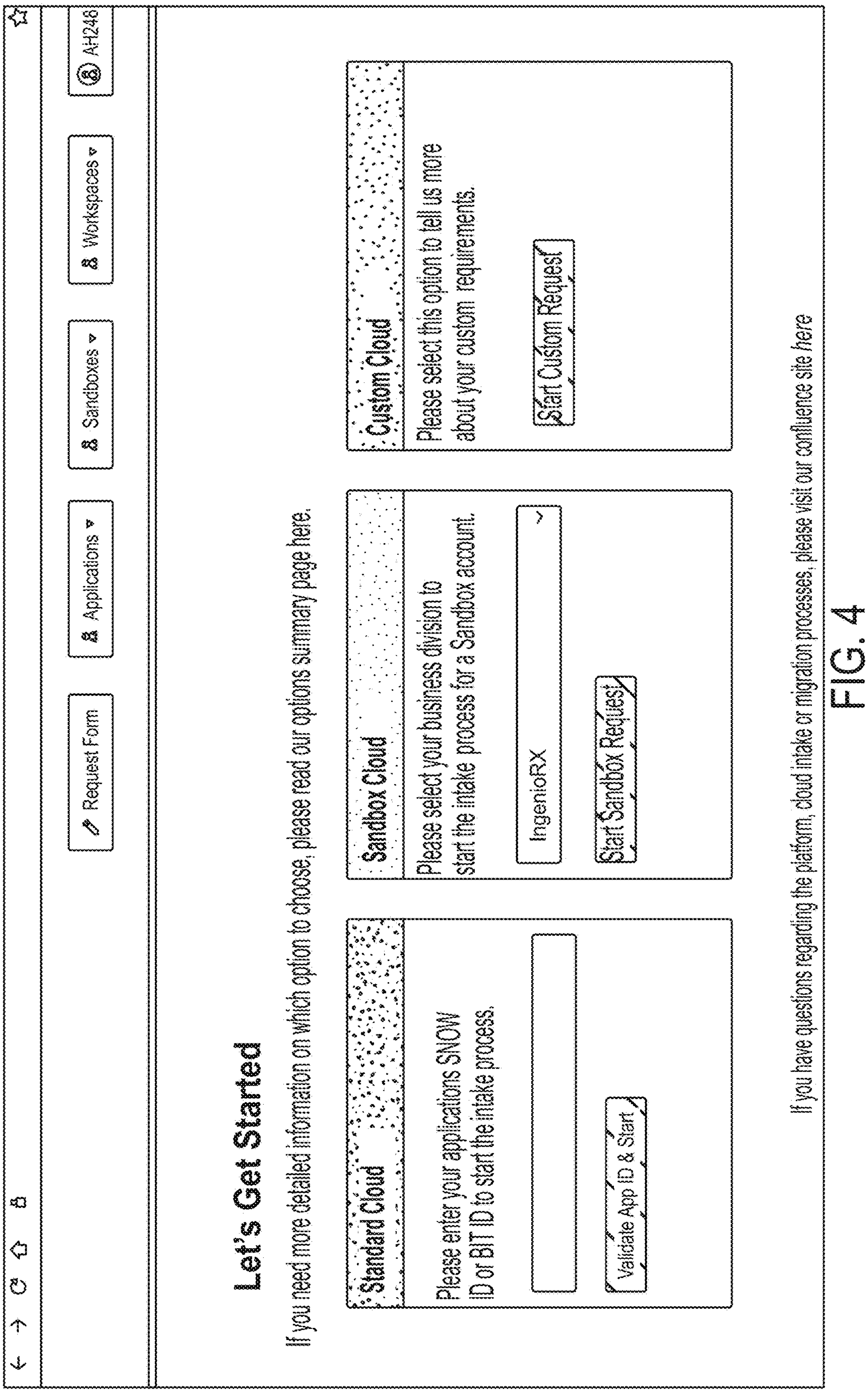
FIG. 4 in an exemplary user interface in accordance with an embodiment of the present disclosure.

The front end portal may be coded in python flask using JavaScript and html and may be hosted on AWS Elastic cloud compute server. After logging in, a user may have the option in the intake form to select different options as mentioned, like Standard account, Sandbox account and custom cloud. If the user has a requirement to build an application that requires services provided by Cloud service providers, which is approved by the company, then 1st action user will perform is select 'Standard Cloud' option. Application is a codified version of business functionality using Cloud providers Services. The application is coded in python flask using JavaScript and html and hosted on AWS Elastic cloud compute server. Flask is a micro web framework written in Python, that simplifies the development of applications. This web application built on Flask may be deployed on AWS Elastic cloud compute instance, and can be chosen via a user interface as shown in FIG. 4.

Figure 5:
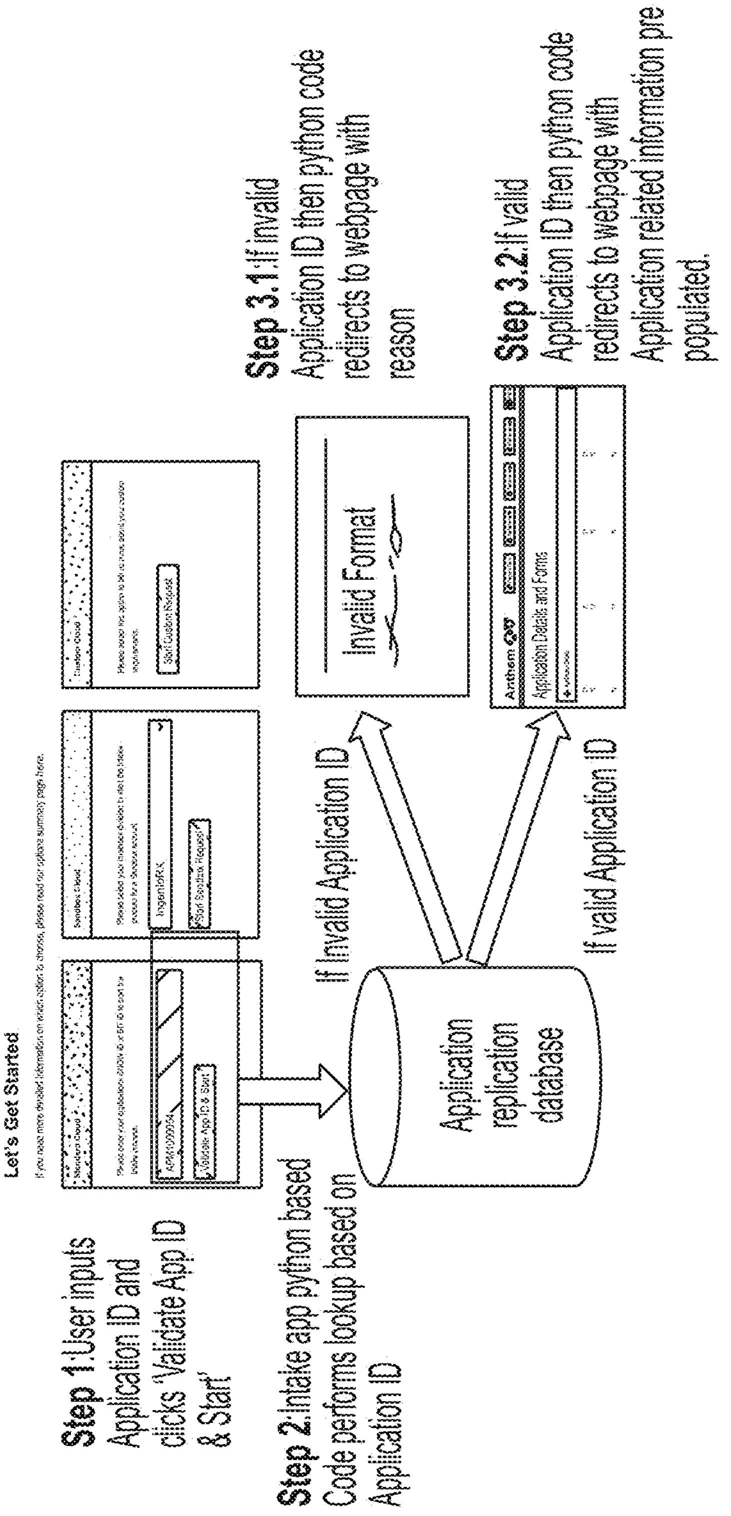
FIG. 5 is an exemplary user interface and a data flow diagram in accordance with an embodiment of the present disclosure.

As mentioned, and described above, the intake web application provides various options like Standard request, Request for Sandbox account and Custom request. When Standard Cloud is chosen, the user may be asked to identify an ID of an application to be developed, and the intake form may lookup the application in an application Master database, using Application ID, and may identify its internal "owner," which may include an IT organization, Business division, or a Service Now group, and may include other information such as the Application's Business name, Application distribution list, etc. More details of the database lookup operation are shown in FIG. 5. The intake application may be configured for read only access to the application Master database. In some embodiments, the code may be written in Python language which executes 'SQL' queries on the application database and performs lookup/read operations. In some embodiments, the intake application may query a replicated database that may be replicated from the production version of the application Master database periodically, e.g. every 30-45 minutes.

Figure 6:
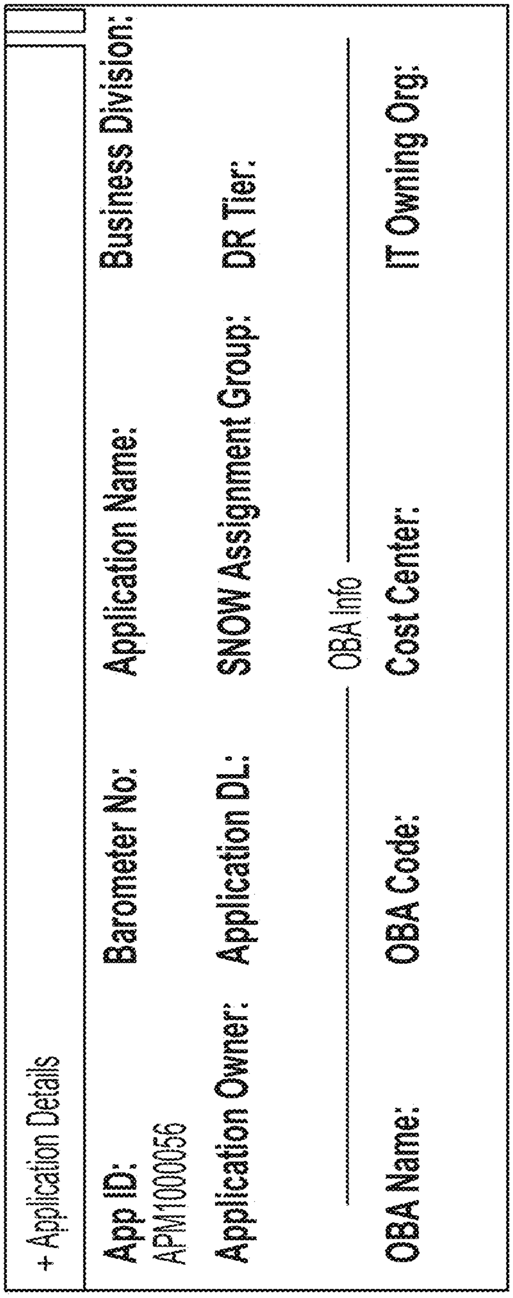
FIG. 6 in an exemplary user interface in accordance with an embodiment of the present disclosure.

If a requester enters an application ID for the application which does not have all required fields, the Intake application will show a message on the screen with the fields that need to be populated in the database before proceeding with the request. In some embodiments, the message is presented in Webform with reason of failure. In some embodiments, this webpage is presented via Python call in case of failure. If the requester enters a valid Application ID the system continues to a pre-populated page with Application Details information from the replicated database as shown in FIG. 6. Application details may include barometer number, application name, business division, application owner, application DL, assignment group, DR tier, OBA name, OBA Code, Cost Center, and IT Owning Org.

Figure 7:
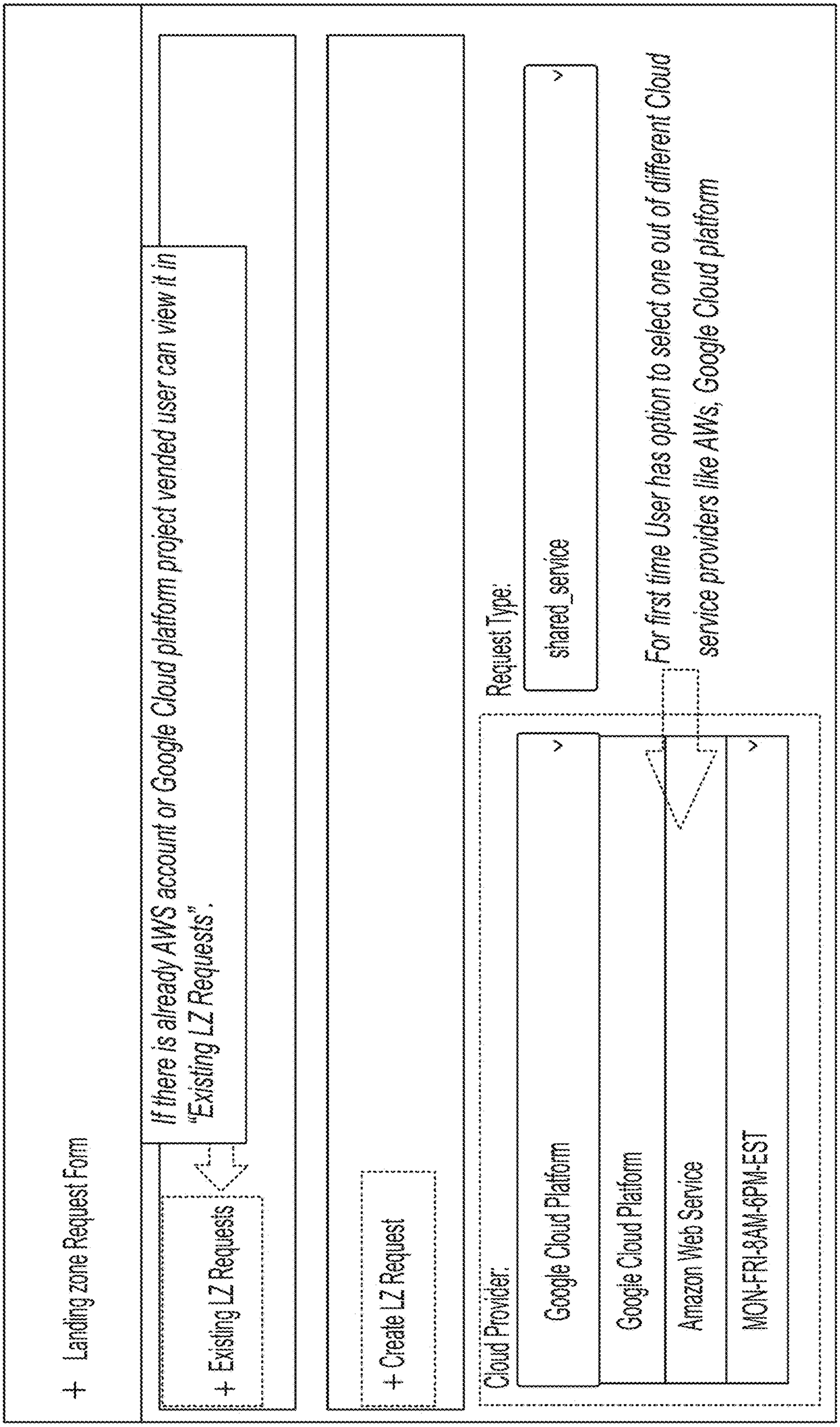
FIG. 7 in an exemplary user interface in accordance with an embodiment of the present disclosure.

If the application information is valid, then the system may present the option to select one out of different Cloud service providers like AWS, Google Cloud platform, as shown in FIG. 7. If user selects AWS than AWS cloud service provider accounts will be provisioned. If user selects Google Cloud platform than Google Cloud platform project will be provisioned when application is submitted. Additionally, if there is already AWS account or Google Cloud platform project vended user can view it in "Existing LZ Requests".

Figure 8:
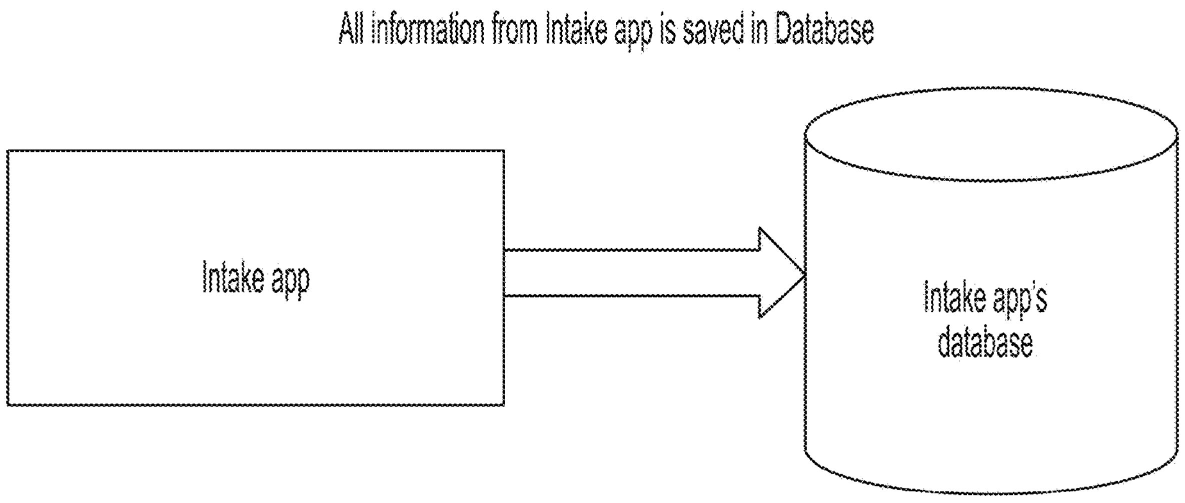
FIG. 8 is a data flow diagram in accordance with an embodiment of the present disclosure.
Figure 9:
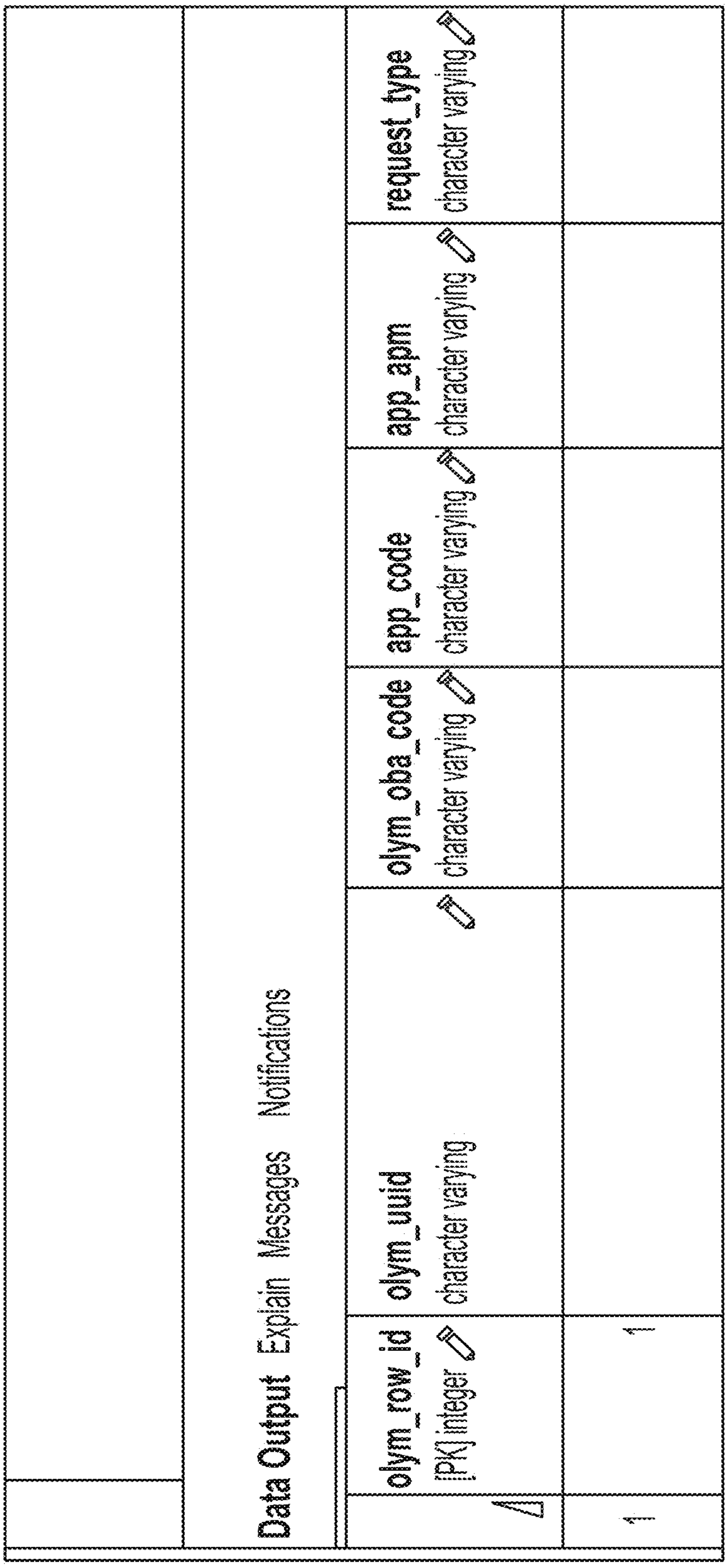
FIG. 9 in an exemplary user interface in accordance with an embodiment of the present disclosure.
Figure 10:
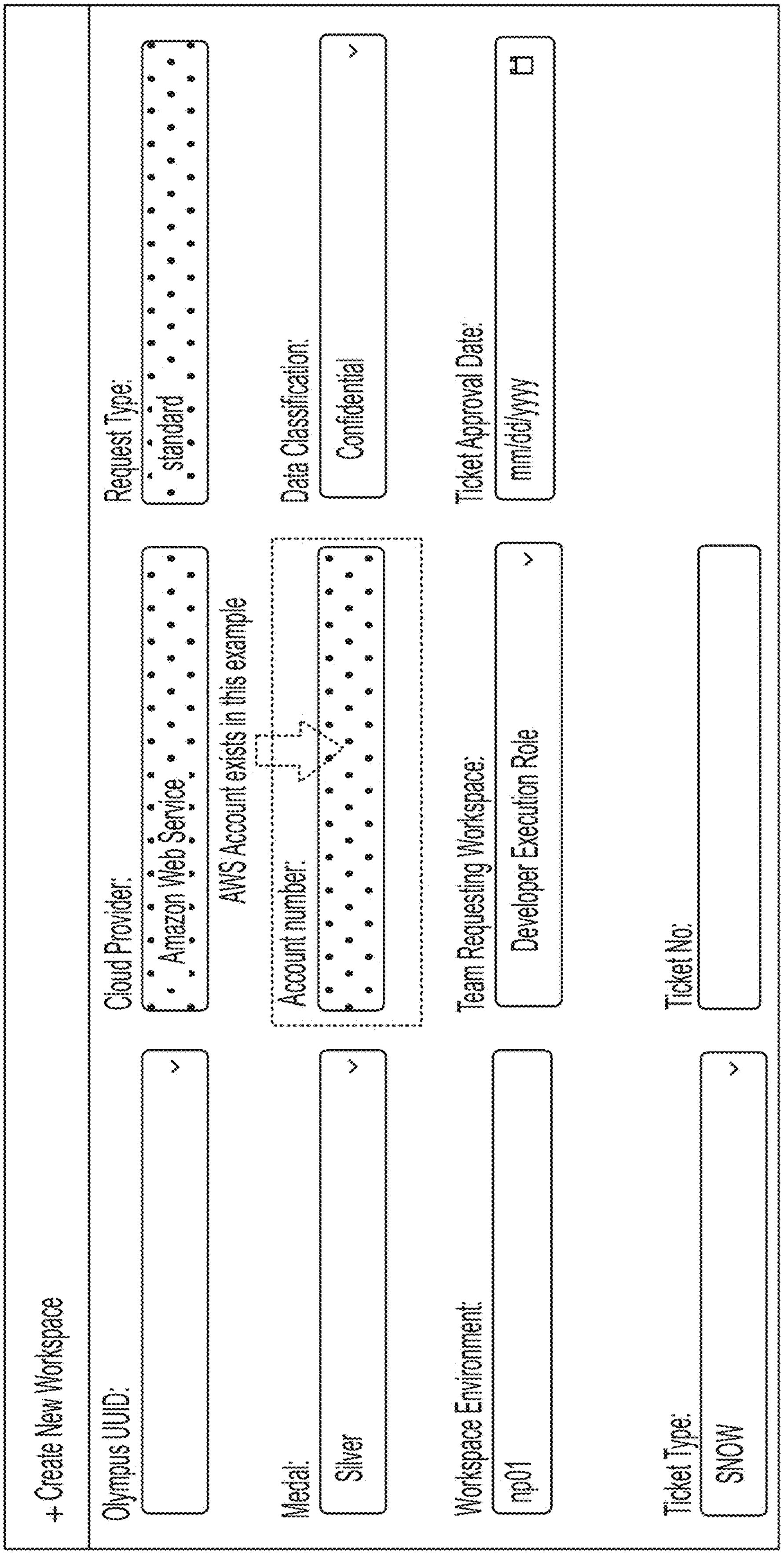
FIG. 10 in an exemplary user interface in accordance with an embodiment of the present disclosure.

The Intake application then checks if an account on the requested Cloud provider exists in an Intake app database as shown in FIG. 8. User selections may be stored in database table as unique records. Each record may include a Unique identifier which can be used in subsequent operations. The Intake database has close to 20+ Tables which stores information related to environment, request, cloud provider, workspace request. An exemplar table is shown in FIG. 9. If AWS account or GCP project already exists in database then information stored in database is presented on webpage as shown in FIG. 10, in which case the requesting user can either request a New Workspace or request access to an existing workspace. In some embodiments, a Cloud provider account to workspace relationship is 1 to many. In other words, an AWS account or GCP project can have many workspaces.

Figure 11:
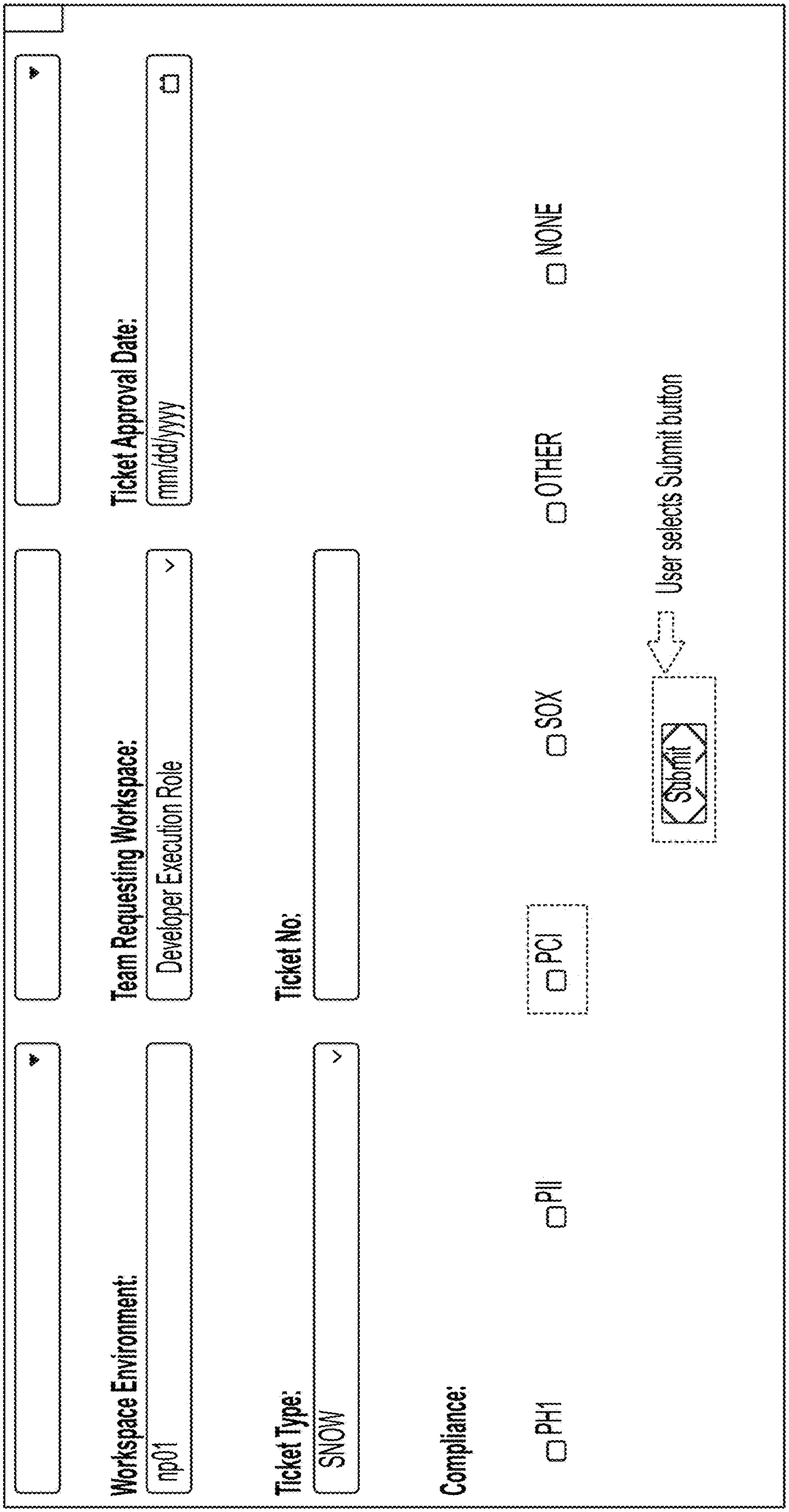
FIG. 11 in an exemplary user interface in accordance with an embodiment of the present disclosure.

The Intake form may also have an option to select compliance needs like Personal Health Information (PHI), Personally Identifying Information (PII), Payment Card Industry (PCI) data, Sarbanes-Oxley (SOX) compliance, or other compliance needs that relate to the requested account. In addition, Data classification needs such as “Confidential,” “Limited distribution,” or “Public” may be needed. If user makes this selection than selected information is stored in Intake database. Once all information is populated and certified by the code and its predefined requirements, information is submitted for intake review, as shown in FIG. 11.

Figure 13:
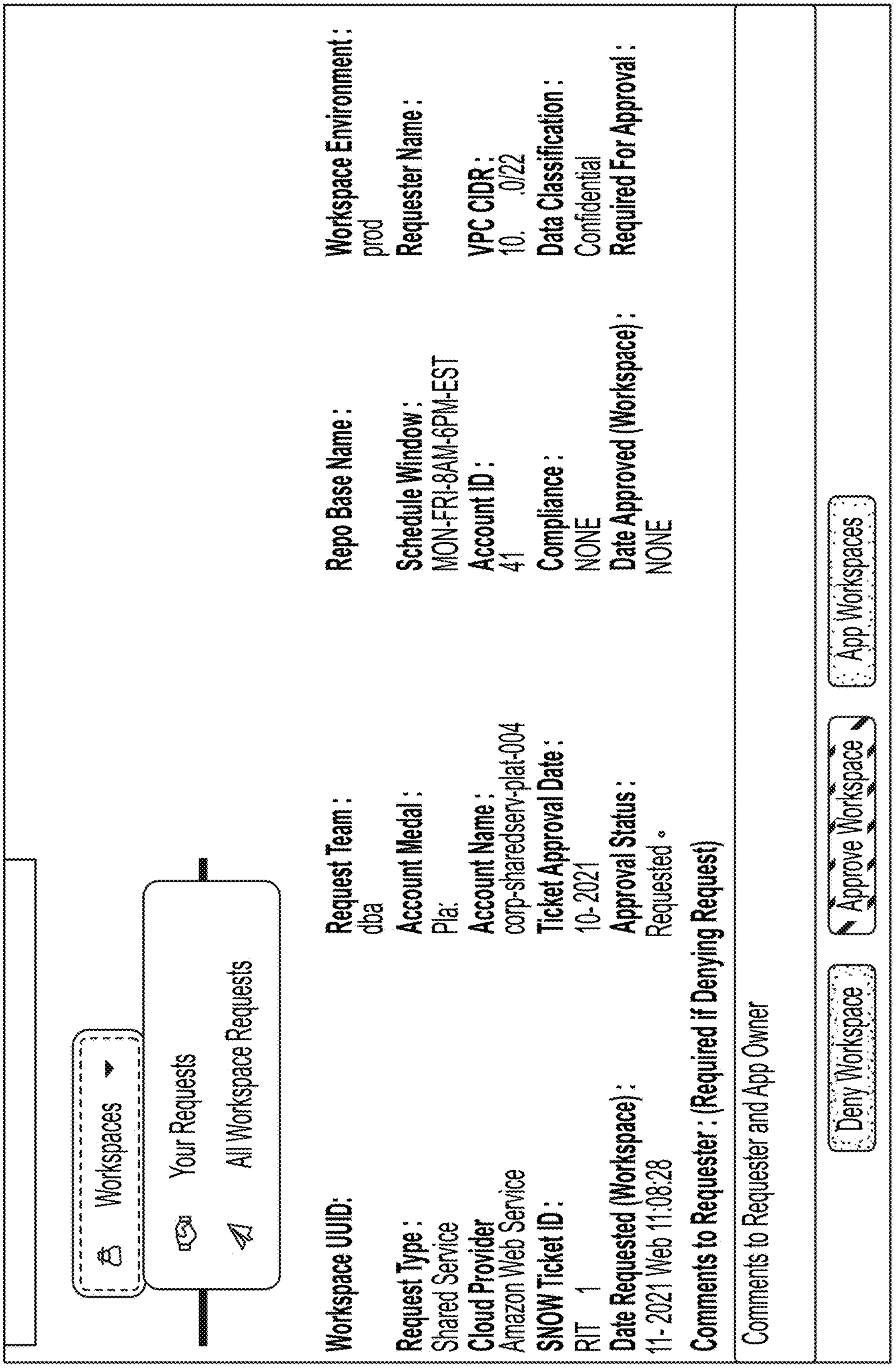
FIG. 13 in an exemplary user interface in accordance with an embodiment of the present disclosure.

Turning back to FIG. 3, submitted information is then analyzed pursuant to intake review (402). After the information is submitted, the Intake Application sends an approval request to appropriate approvers, which may in some embodiments appear similar to the email of FIG. 12. The recipient of the approval request, who may in some instances be the owner of the application that will be developed pursuant to the requested account, then enters the portal, which may in some embodiments have user interface elements similar to those shown in FIG. 13. The approver may then perform diligence, e.g. manually, and then either approves or denies the request. If denied, the requester will be able to edit and re-submit the request until it is validated and approved. If the request is approved (403), the system receives approval for the intake request, and the intake app will invoke the proper AWS step function to execute the next steps.

In some embodiments, steps after approval are fully automated. Turning back to FIG. 3, distribution lists (DLs) may be created (404) after the system receives approval for the intake request. In some embodiments, the system uses two types of distribution lists, AWS account email and Application internal distribution lists.

Every time a new AWS account is created, AWS requires a unique email address that has not been associated with any other account for at least 90 days. Every time the system vends a new account, it creates this distribution list and automatically associated team members to this newly created DL. The distribution list will be used by AWS for notification related to the accounts and other management tasks. For example, deleting and purging the account.

Application internal distribution lists may be used internally by the application teams and also as a point of contact for the portal. The portal may give an option to the requester to enter an existing DL. If the requester decides to use a new DL, the portal may create a DL using the format below:

Naming convention:
AWS account email:
his DL will always be created when a new AWS account is vended:
dl-<bu code>-<oba code>-<medal>-<counter>@domain.com, where:
bu_code: corpx, xx, xxx, xxxx, xxxxx, xxxxxx, or xxxx
oba_code: is the shortened version of the Primary capability name.
Medal: brz, slver, gld or plat
Counter: This is identifier that guarantees uniqueness on the distribution name required by AWS. It allows for the portal application to increment the value until it satisfies the AWS requirement.
Application email:
If the requester opts to create a new DL, the DL will be name using the format:
dl-<bu code>-<oba code>-<app_name>@domain.com, where:
bu_code: corp, dig, gbd, dbg,hun, csbd, or irx
oba_code: is the shortened version of the Primary capability name.
App_name: This is the APM ID of the application from the Application Master Database.

In some embodiments, system determines whether the account is requested on a first cloud platform or a second cloud platform. In some embodiments, the first cloud platform is AWS and the second cloud platform is Google Cloud. In some embodiments, the AWS account DL creation applies only when the account requested is an AWS account. Google projects do not require an email ID to be created. In some embodiments, the Application DL creation applies only when the requester opts for creating a new DL.

Figure 14:
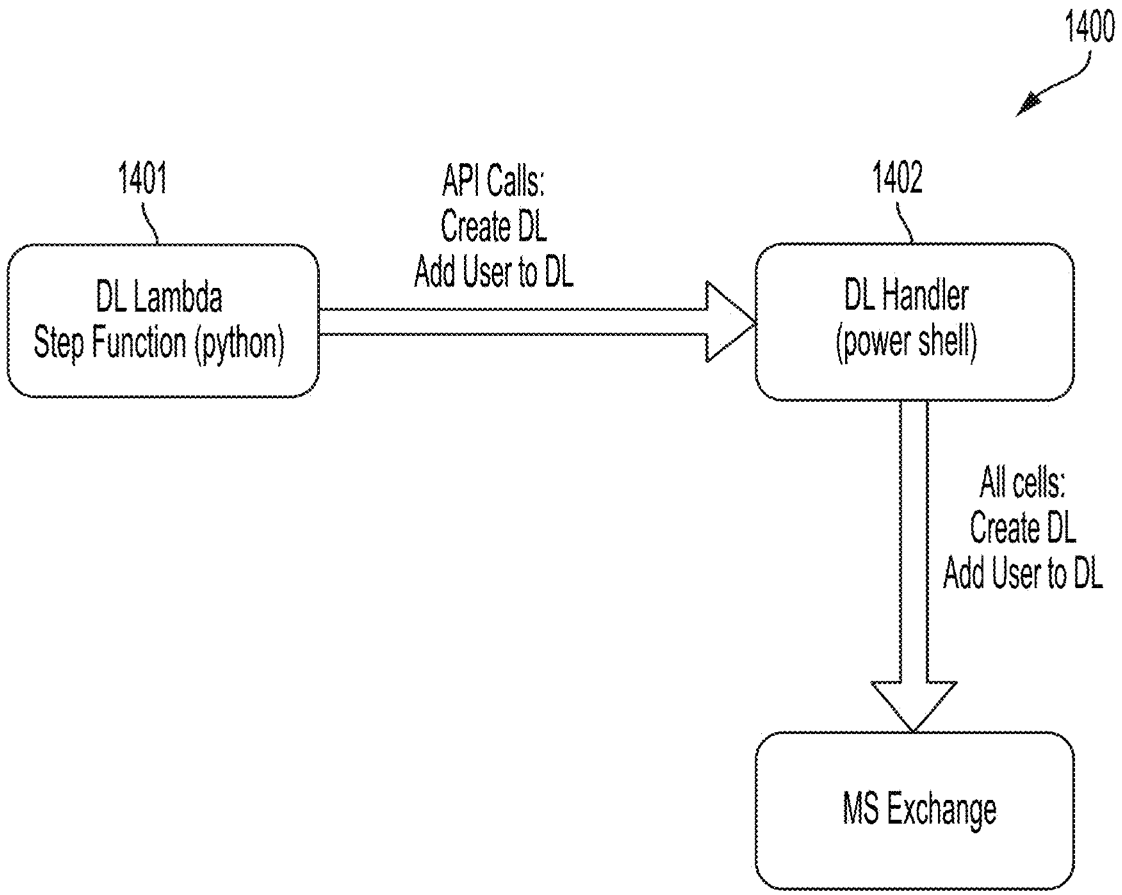
FIG. 14 in a flow diagram in accordance with an embodiment of the present disclosure.

In some embodiments, the distribution list is created using a process the same as or similar to process 1400 depicted in FIG. 14. In some embodiments, DL lambda 1401 is an AWS application that invokes the actions and DL handler 1402 is a flask/python application. In some embodiments, a two layer execution process is created because Microsoft PowerShell commands must be done from a Windows server rather than from an AWS Lambda function.

For application development, user can request a New Workspace. Workspaces provide isolation so that other applications do not change or modify application code and do not have access to business-critical functions. Once user clicks ‘Submit’ option, the Intake application creates Application Distribution list (404) and then creates workspace and Cloud provider account if it does not exist. If Cloud provider account already exists, then it only invokes Terraform module to create Terraform workspace.

Turning back to FIG. 3, next the system determines from the intake input data whether an environment is requested (405). If an environment is not requested, an existing environment may be associated with the account. If an environment is requested, the system then creates an environment (406) on the first cloud platform or the second cloud platform. In some embodiments, the first cloud platform is AWS and the second cloud platform is Google Cloud.

If an environment is requested on AWS, the environment may be created using AWS Account Vending Machine (AVM). Account creation process is performed using Account Vending machine (AVM), which is a service provided by AWS that allows customers to create new AWS accounts. In some embodiments, AVM may be triggered via AWS step function, which has a step that calls an AWS Lambda function named AWM handler. In some embodiments, the code of this AWS Lambda may be written in Python and may be triggered by the output of the Intake application which in some embodiments may be a Javascript Object Notation (JSON) object. Orchestration of this process is done via AWS Step functions. Steps for Account creation may be as set forth below:

First, the Intake application pushes an event in an AWS Queue called as AWS Simple Queue Service (SQS). It utilizes a Push method compatible with AWS SQS. Next, when the SQS gets the new record/queue, there is an event bus rule triggering (its monitors periodically, e.g. every 5 mins) and triggers AVM handler lambda to create a new account. Event bus is AWS service which can create triggers at predefined time. Next, AWS lambda function gets invoked by trigger and consumes data, e.g. a JSON object, from the Intake as an input and executes the flow in a serial process.

AWS lambda consists of 3 different utilities, which may written in python code to fulfill the account creation. An SQS Record Pulling function may read queue records one by one and take as Json dump input to the AVM vending machine. A Calling Service Catalog Product function may receive a JSON input to create account and call an AWS service catalog API to create an account under master account. The Calling Service Catalog Product function may be an AWS Service catalog product that may consist of cloud formation templates designed by AWS that help to create a new account under Landing zone/organization. In some embodiments, a CloudFormation template code may be written in YAML format and have a series of events like network creation. AWS CloudFormation simplifies provisioning and management of infrastructure on AWS.

Once the AWS lambda function and its component utilities are successful or python code returns success response, the details like network information may be updated in Intake database. AWS service catalog (cloud formation templates) provides JSON output of account creation with VPC ID, subnet ID etc., which can be captured in an Intake DB, e.g. for audit and compliance purposes.

If the environment requested is a Google Cloud environment, this environment may be created using a Google Cloud Platform launcher. When a GCP project is requested, a step function kicks off an AWS Batch service/EC2 instance that may generates a script, e.g. a terraform script, and run that script against Google. The code to perform this function may be written in GO language.

Figure 15:
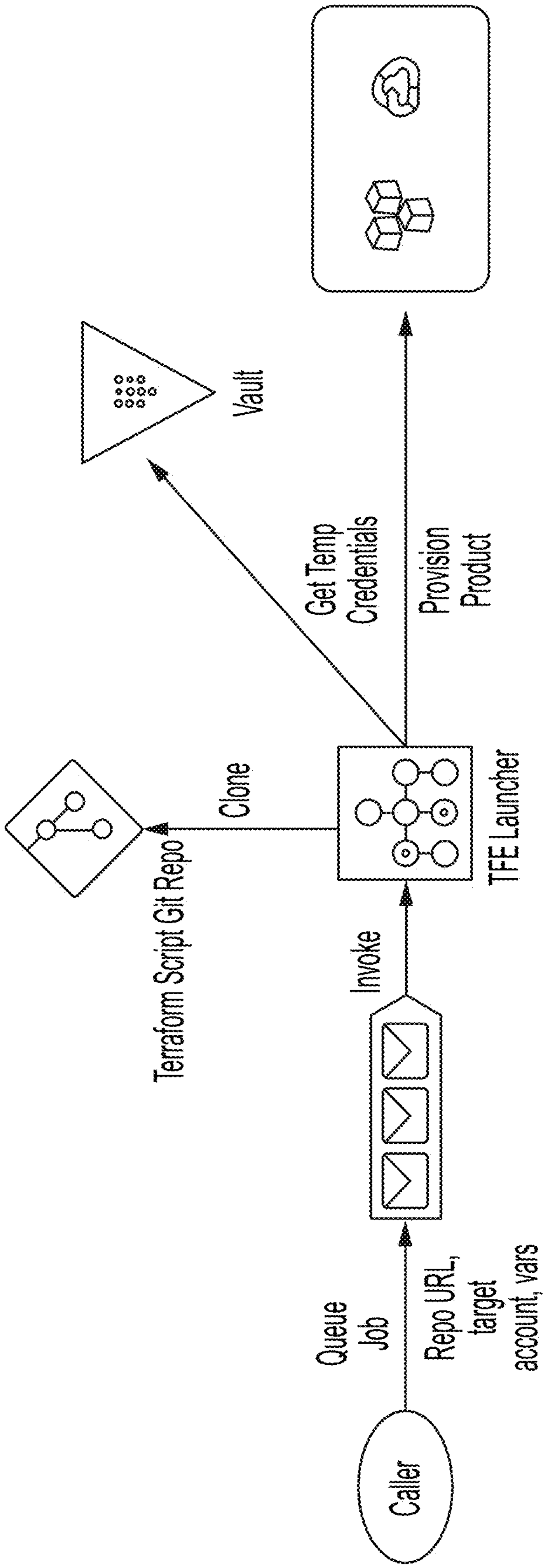
FIG. 15 in data flow diagram in accordance with an embodiment of the present disclosure.

FIG. 15 is a high level flow of this function. A Terraform script defines what resources needs to be created and how they are created. A vending process defines where they will be created and how they will be identified and accessed. A launcher vending process may combine information from three sources and creates a project in Google Cloud platform as the final product. These three sources may include Terraform scripts, which can be either Sandbox or Standard; credentials, which give permission for the terraform scripts and are safely secure, e.g. in a vault, and variables, which may include intake data that defines where the projects will be created and who will have access to what resources.

Returning now to FIG. 3, the system then determines (407) what to do next, which depends on whether the requested account is an AWS account or a Google Cloud account. If the account is an AWS account, the process continues to the network handlers (408) and then the logging handler (409) steps.

Network handler creation (408) may include creating a network handler that includes a private domain name hosted zone associated with a virtual private cloud. If the request is for an AWS environment then an AWS lambda related to Network provisioning is triggered. For each AWS account, a network has to be created. This network may be a Virtual Private Cloud (VPC) in which application can be deployed.

Each vended account may include a unique identifier based on the tier of account, which may be represented by medal colors, e.g. Silver for development, Gold for Preproduction, or Platinum for Production, Oba code and Business division. In order to facilitate the use of names instead of IP addresses, the portal may provide an account with its own private Hosted Zone. Hosted zone is a container of DNS records. This name will be visible by the VPCs in the vended account and by the on-premise network, including VPNed in devices to the Anthem network. In some embodiments, private hosted zones would not be visible from other vended accounts.

In some embodiments, a naming convention similar to the following could be used: <Medal>-<BD>-<OBA>.awsdns.internal.das. In some embodiments, a DNS hosted zone may be created for each OBA, rather than for every application. As an example, a website application under the silver medal, sample OBA and XXXX Business would be able to name the server "http://www.slvr-xxx-sample.awsdns.internal.das" instead of "http://10.10.123.234/."

By default, when creating a private AWS hosted zone, only the account primary VPC is associated with it. In other words, only hosts and resources within that VPC will be able to use the names. In some embodiments, as part of the vending process, the portal also associates that Hosted Zone with the DR VPC for production (aka Platinum) environments and Shared Service account VPCs for all environments. Association with the Shared Service VPCs may be required because the Shared Service accounts propagate DNS information to the on premise DNS services, rather than the vended account doing so.

Network handlers may in some embodiments be created in accordance with the following steps. When a new AWS account is created, a lambda function creates a hosted zone and the associations within the vended account. The lambda function also creates an association request to the Shared Services account VPCs and accepts the association requests in the Shared Services account VPC(s). In some embodiments, the lambda function uses AWS python boto3 libraries that execute the hosted zone creation and proper association steps.

If an environment is requested and if the account is requested on the first cloud platform, e.g AWS, the system may then proceed to configuring (409) logging to be stored in a centralized logging account associated with the first cloud platform. Logs are helpful and sometimes necessary for troubleshooting, traceability and organizational compliance. Accordingly, it may be necessary to enable logs programmatically when an Account is vended. In some embodiments, it may be a best practice to stored the logs in a Centralized AWS Logging account. In some embodiments, the logic to perform this operation may be coded in AWS lambda which is written in a "Go" Language. In some embodiments, a standard CloudFormation template, for example Infrastructure as Code (IaC) provided by AWS, may be used for configuring logs. Cloud formation may be available in a storage bucket. Templates may then be fetched and executed via AWS API call to attach Logs to AWS resources to Account. Logs may then be attached and/or configured for resource, and then Log storage destination may be set, e.g. as Centralized AWS Logging account. This ensures for any new vended accounts Logs are configured and routed to centralized account.

Figure 16:
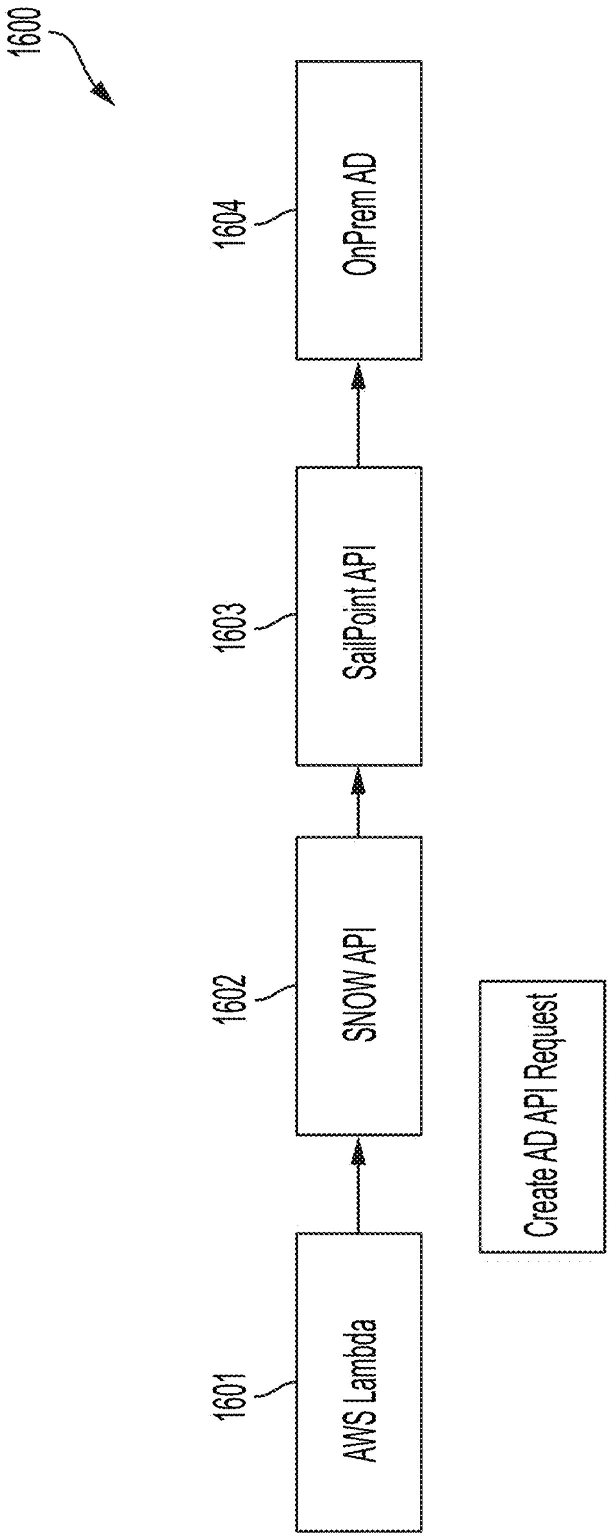
FIG. 16 in a flow diagram in accordance with an embodiment of the present disclosure.

Turning back to FIG. 3, Active Directory (AD) Groups may then be created (410) if they do not already exist. In some embodiments, this may occur without regard to whether an environment is created and/or without regard to which cloud provider account is being requested. In some embodiments, the system may determine from the role data whether an existing Active Directory group exists relating to the role data. If an Active Directory group exists for the role data, the system may associate the account with the existing Active Directory group. If an Active Directory does not exist for the role data, an Active Directory group may be created for the account according to the role data and the account may be associated with the created Active Directory group. Access to created cloud account and various services may be controlled by provisioning active directory groups and adding users to this group. This helps to provide permissions to users based on their role-based access. This helps in isolation of user permission in standardized way. This may occur using a subprocess similar to process 1600 as shown in FIG. 16.

For Application users or developers to access the provisioned Account on the selected cloud platform, role-based access active directory groups may be required. This may be achieved by triggering AWS Lambda function 1601. AWS Lambda function 1601 evaluates whether the request is for Cloud provider AWS or Google Cloud platform based on intake data. An active directory group is created using application name, registered Application ID, a Cloud provider identifier (e.g. 'AWS' or 'Google Cloud platform') and role data (e.g. 'Developer' etc). AWS Lambda function 1601 invokes Application Master Database API 1602 which creates a service request on the Application Master Database for new Active Directory group creation. Application Master database-backed workflow triggers Access Request API 1603, which may be a SailPoint API, and which provides access request workflow. Access Request API 1603 may then be integrated with Active Directory 1604, e.g. On Premise Active Directory, to create the requested role based Active Directory group, if such a group does not exist. Once requested AD group is created or located, users are added to the AD group. A new user who wants access to a provisioned Cloud provider account in future will then be able to request to be added to created AD group, e.g. by raising a Service Now request.

By way of example only, suppose Application A has Database Administrators (DBAs) for DBA-related activity of the application in a provisioned account. These DBAs should be associated to an Active Directory group for Application A, and this Active Directory group should be linked to the provisioned account. In this step 410 the Active directory group is created. When the previous steps as described above are executed (e.g. steps 401 to 409 of process 200 of FIG. 3, as appropriate given the specific account request), AWS lambda 1601 is triggered. AWS Lambda 1601 is triggered by output (e.g. JSON objects) from Step 409 (in case of new AWS environment request), output from Step 407 (in case of new GCP environment request), or output from Step 405 (in case of existing environment but New Workspace). AWS lambda 1601 performs action described above by calling Application Master Database API 1602.

Example of AD group for Database activity role: CAW-<AWS Account ID>-<Medal example Silver>-<Application ID>-dbarole When a new DBA wants access to a provisioned Cloud provider account in future, the new DBA will have to request access, e.g. by raising a Service Now request to be added to created AD group.

Turning back to FIG. 3, AD groups as created or discovered in step 410 are associated (411) with environments. In some embodiments, the existing Active Directory group or the created Active directory group, that is associated with the account, may be associated with the existing environment or the created environment that is associated with the account.

AD groups created as part of step 410 needs to be linked to an environment, and security guardrails are may be necessary and may be provisioned, e.g. in accordance with company security and compliance policy, using automation. These policies can be upgraded based on security policy changes and policies may be automatically enforced.

Figure 17:
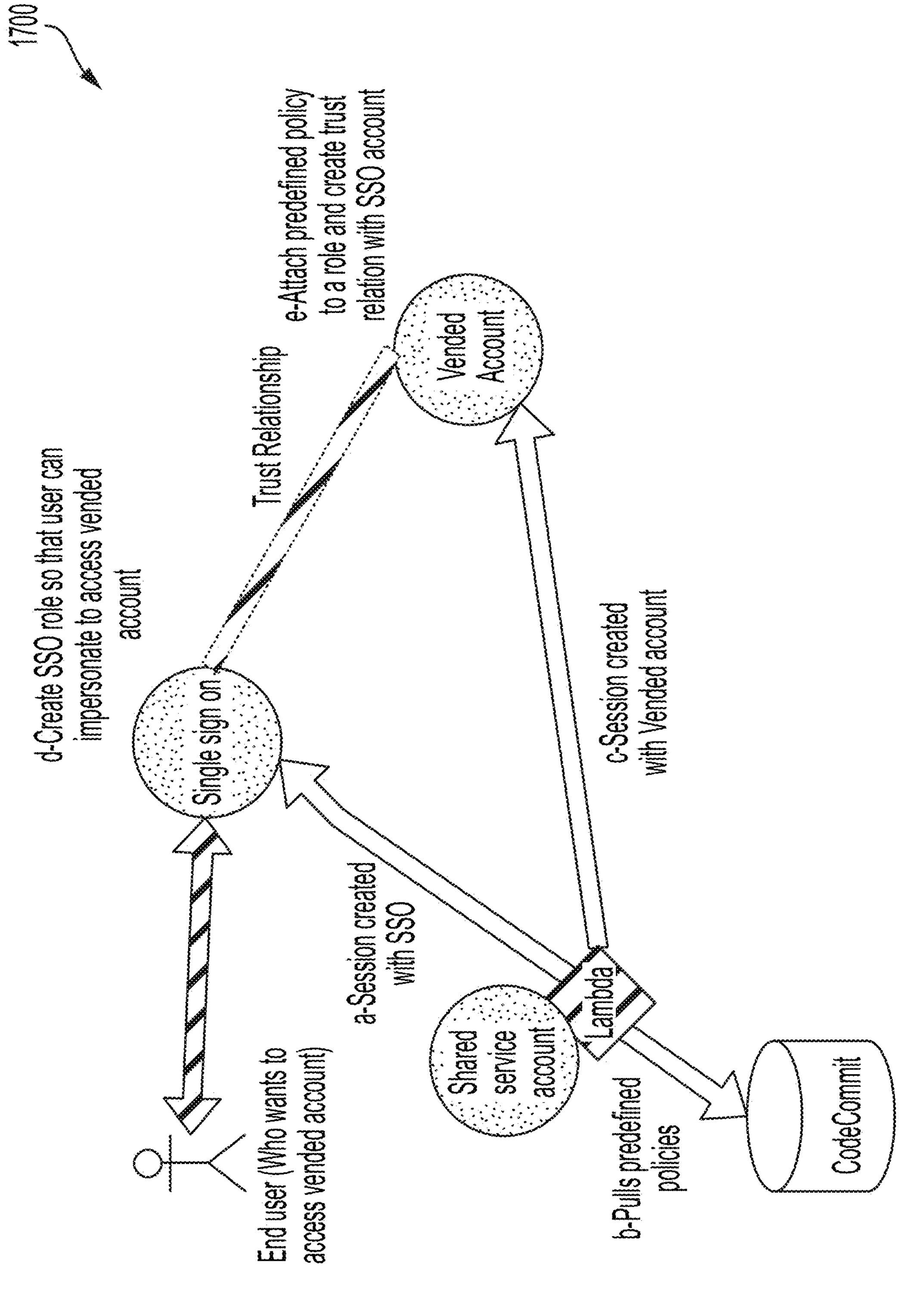
FIG. 17 in a data flow diagram in accordance with an embodiment of the present disclosure.

Approval from reviewing authority or change in organization guardrails or policy may trigger an automation process, which may be similar to process 1700 as shown in FIG. 17. Python and cloud service provided serverless functions may be used for this automation. The automation code utilizes predefined organization security guardrails and guardrails predefined by cloud provider. The pre-defined security guardrails or policies may be in JSON format and may be stored in a repository like code commit. The policy objects may also be associated with specific Identity and access management roles, such as "Developer." The policy defines what action or actions a specific Identity, and/or access management roles like Developer role, can perform.

Security policies are used by cloud service provided serverless functions i.e AWS Lambda, in two scenarios. Cloud service provided serverless functions are invoked by an event, which is executed or run in existing AWS Account which may be referred to as a "Shared Service" account, because it is host account for shared resources.

If security policy needs to be changed for an entire organization, code commit may be configured with triggers that generate events if any changes are performed. In this case, In AWS code commit, after changes are pushed, event driven triggers are generated. The event has information about changes in policy. This trigger may be in the form of a JSON packet, which can invoke a Cloud serverless function. In this cloud function, a list of all AWS already created accounts is obtained. Once the Cloud serverless function receives a list of all already created accounts, it applies changes of policy, e.g. a chance of policy document, to all Identity and access management roles. This process may use Continuous Integration and Continuous deployment pipeline to attach changes to Identity and access management roles without human intervention. Accordingly, changes in these policies may be inherited or applied to every underlying account.

An approved request for new Cloud service provider account or workspace may also act as a trigger, which may be in JSON format. In this instance, the trigger invokes cloud service provided serverless functions, and performs the operation of creating Identity and access management roles. Permission or actions which can be performed by these Identity and access management roles may be governed by pre-defined security guardrails or policies in JSON format which may be stored in a repository like AWS code commit as described above. Security guardrails are enforced on AWS account in multistep, e.g. using python code in cloud service provided serverless functions.

The cloud service provided serverless functions, enables, or opens a session with a Single sign on (SSO) server. Users can access Vended AWS account via SSO. Serverless function, e.g. AWS Lambda checks out or pull security guardrail document or policy, which may be in JSON format, from AWS source repository i.e AWS Code commit. The Serverless function may then enables a session or a connection with the vended AWS account. The Serverless function may then create an SSO role in the SSO, which may be used to create a trust relationship with the AWS vended account. Because an end user can access vended account only via SSO, a trust relationship is important for security. In final step, Serverless function creates a role by attaching Security guardrails to the vended account and creating the trust relationship with SSO. Above steps, in accordance with process 1700, ensures that security guardrails are enforced on Vended AWS account and trust relationship is created between SSO and vended account, so that end users can access vended AWS account via SSO.

As an example only: a user from a business division wants to deploy a business functionality in the form of an application to cloud account. In this instance, the first step will be provisioning the cloud account via the intake process, as discussed above. The cloud account that will be provisioned should be compliant to any applicable security and compliance policy guardrails. Once intake review process is approved, cloud account will be provisioned, and automation code, as described above, will enforce security guardrails. This will ensure any resources within the cloud account are secure and do not violate security and compliance policy. So, by this process, users will not be concerned about security and it is enforced as "security by design" rather than manually validating and enforcing.

Returning to FIG. 3, a workspace and/or a repository may be created (412) and associated with the account. An application developer may perform application development activity, using, e.g. Enterprise Terraform. An AWS Lambda may initiate a process to create a Terraform workspace and/or a Bitbucket repository either or both of which may be used by application teams to deploy and store infrastructure/application related code. Each AWS account or GCP project can have 1 or more than 1 Workspaces associated with it. The AWS Lambda used for workspace creation may be referred to as Workspace Creation Handler. This Lambda is triggered by an output generated from Step 411 in FIG. 3, which may be a JSON object. Additionally, a JSON object created from Step 410 may contain Active Directory group information.

Applications developed in certain environments may require an entry point and central location for creating and managing its resources. Some ecosystems may dictate that the only path for the application team to create and modify resources in the provided account or project be through Terraform or a system similar to it.

A workspace may be in this format or one similar: <Cloud provider><application ID ID>-<Role>-<SDLC>

A workspace may be named after the cloud provider, application ID, a tier (which may be represented by a medal, e.g. bronze, silver, gold and platinum) and/or a role (which may include developers or database administrators). Other names may be manually entered. Applications may have multiple workspaces associated with them.

The final product for the workspace and repository handler is a bitbucket repository directly connected to one or more workspaces. Proper authentication and authorization permissions may be given to the requester and the application owner in the repository and the workspace. Mandatory attributes entered during the intake process may be written as variables in the workspaces. Each application/role will have a single bitbucket for one or multiple workspaces. This may result in the same code base being used for all tiers. Differences between environments may be designed using condition statements and/or variables. For example: If the variable SDLC is dev, the cluster should have a single server, otherwise 4 servers.

An authentication token for the terraform enterprise organizations and the bitbucket credentials may be stored in a vault, which may be created by or in Hashicorp Vault. Vault may protect these secret engines allowing only certain specific methods to access them. One of the methods used by Vault is the Identity and Access Management (IAM) role. The lambda handler IAM role is allowed to retrieve these secrets during execution time.

Returning to FIG. 3, vault secrets may be created (413) and associated with the account. Once Terraform Workspace and BitBucket repository is created in step 412, access to AWS account for Terraform may be enabled using Hashicorp Vault which stores secrets, so that secure connections between Terraform and AWS vended account can be established.

Figure 18:
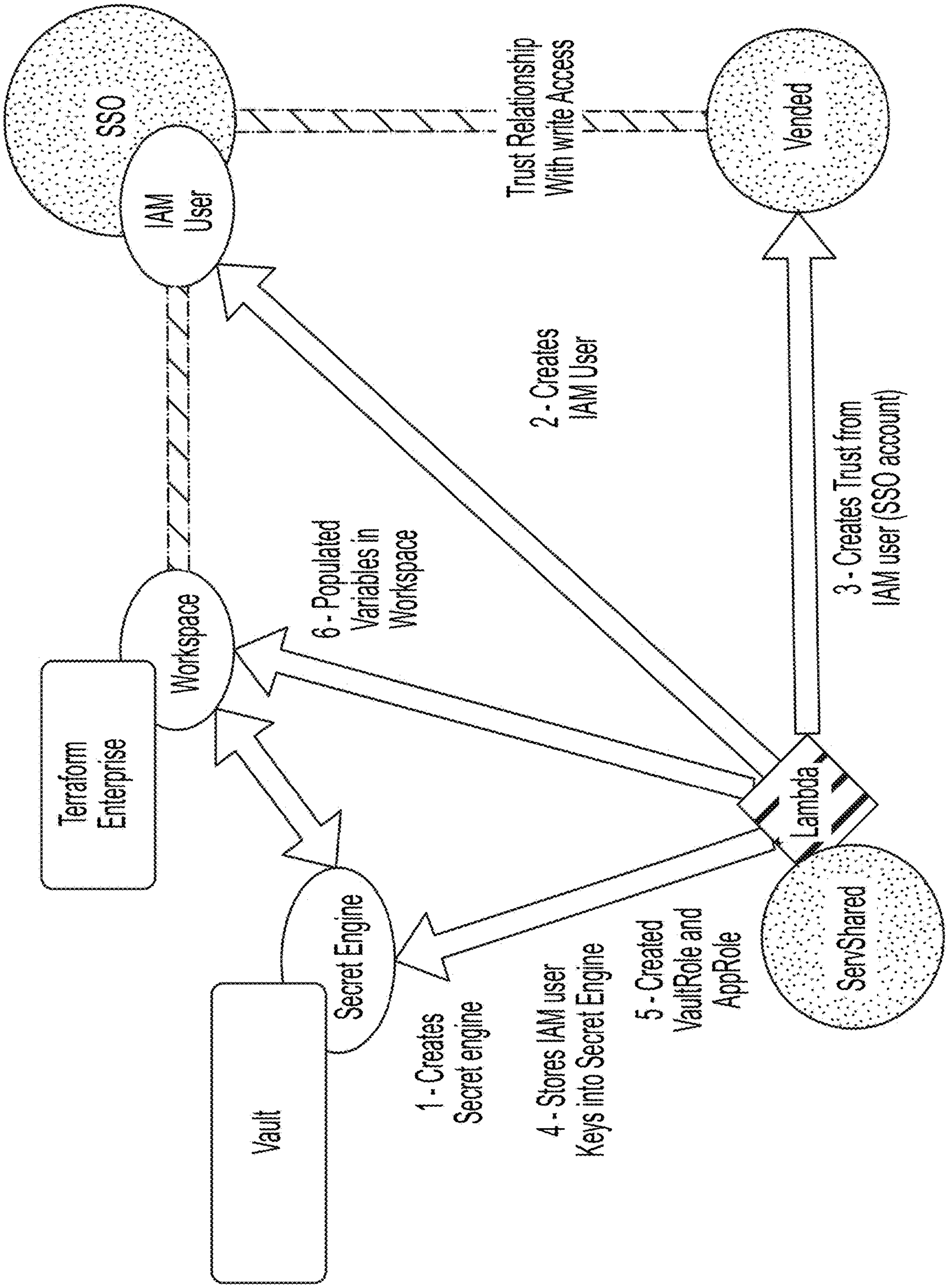
FIG. 18 a data flow diagram in accordance with an embodiment of the present disclosure.

Step 413 is triggered by an output, e.g. a JSON object, which is generated as output of Step 412. In some embodiments, operations may be written in Python code which is executed by AWS Lambda i.e. AWS serverless function. Vault secret creation may be performed in accordance with a process as disclosed in FIG. 18. The python code once invoked executes methods or functions as shown: Configure Vault and Create Namespace/Secret Engine Method-Python code has a function or method written which has block of code which initializes vault object and creates namespace/secret engine.

The function first initializes Vault's objects and sets various variable like OBA code, Cloud provider, application id, terraform CIDR to value provided by JSON object in step 412. The function then Initializes AWS Dynamic Secrets Engine (ADSE) using a Vault object. After a secret engine and namespace are created, another method is invoked, which creates a static credential in a Single sign on account, and enables permissions for it on the target AWS account. The function then utilizes AWS provided methods to create static credentials. The method utilizes the static credential to create a trust relationship between SSO account and Target vended account. The method then calls vault provided POST API and stores Credentials in Vault in the form of a key and value pair. The method then creates an App role, which is effectively a policy document, and defines permission. This app role is used by Terraform to read credentials from Vault and access the target vended account.

Returning now to FIG. 3, the process 200 then determines (414) whether the cloud account is an AWS account or a Google Cloud account. If the account is an AWS account, then at least one resource associated with the account may be tagged (415) with a resource tag, which may occur via a tagging handler. AWS resources tagging can be used for a wide range of activities. Billing, log and monitoring grouping and permissions are some of the examples in which tagging can be used. The tagging method reads tags populated during the intake process, which may be in a JSON object. It creates a boto session between the lambda and the vended account. Using the Lambda assume role permissions, it writes the listed tags into the resources that were created as part of the vending process.

As the process is nearly complete, a notification handler may then be invoked to transmit notifications (416) about the status and results of the process. This may occur via email. In some embodiments, the notification handler may send a success and workspace creation notification, a failure notification, a financial notification, or a multi factor authentication notification. In some embodiments, the email may contain information relating to access, permissions, security, active directory groups, environments, workspaces, or repositories. The Intake App Database may then be updated (417) with information relating to the accounts, environments, workspaces, repositories, active directory groups, logging, networks and/or vault secrets that were created during the process.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations are chosen in order to best explain the principles underlying the claims and their practical applications, to thereby enable others skilled in the art to best use the implementations with various modifications as are suited to the particular uses contemplated.

What is claimed is:

1. A computer implemented method for managing security policies and network configurations across multiple cloud-based accounts, the method comprising the steps of:

receiving a security policy update for an organization;

automatically generating, in response to the security policy update, event-driven triggers in a code repository;

applying, based on the event-driven triggers, the security policy update across multiple cloud-based accounts associated with the organization;

creating, for at least one of the cloud-based accounts, a private hosted zone in a virtual private cloud;

associating the private hosted zone with a shared service account, wherein the shared service account propagates domain name system (DNS) information for use by the virtual private cloud;

determining, based on intake input data, a tier designation for the at least one cloud-based account, wherein the tier designation is one of: sandbox, development, system integration testing (SIT), or production;

configuring the at least one cloud-based account based on the determined tier designation; and updating an intake database with information relating to the security policy update, the DNS configuration, and the tier designation for the at least one cloud-based account.

2. The method of claim 1, further comprising providing a self-service portal for users to request cloud-based accounts.

3. The method of claim 1, wherein applying the security policy update comprises using a Continuous Integration and Continuous Deployment (CI/CD) pipeline to attach changes to Identity and Access Management roles without human intervention.

4. The method of claim 1, further comprising creating multiple workspaces associated with a single cloud-based account.

5. The method of claim 1, further comprising generating and sending a multi-factor authentication notification related to the at least one cloud-based account.

6. The method of claim 1, further comprising tagging resources associated with the at least one cloud-based account for billing and cost management purposes.

7. The method of claim 1, wherein the intake input data is received via a self-service portal accessible only within a local network.

8. The method of claim 1, further comprising looking up an application ID in an application replication database to determine whether the application ID is valid.

9. The method of claim 1, wherein the intake input data comprises data indicating that the account is one of a standard account, a sandbox account, and a custom account.

10. The method of claim 1, further comprising:

initializing a vault object;

creating a secrets engine;

initializing the secrets engine using the vault object;

creating a static single sign-on credential relating to the at least one cloud-based account;

creating a trust relationship between the single sign-on credential and the at least one cloud-based account; and storing a key and value pair representing the single sign-on credential in a vault.

11. The method of claim 1, wherein the multiple cloud-based accounts comprise accounts on a first cloud-based platform and a second cloud-based platform.

12. The method of claim 11, wherein the first cloud-based platform is Amazon Web Services, and wherein the second cloud-based platform is Google Cloud Platform.

13. The method of claim 12, further comprising creating an Amazon Web Services Account using Account Vending Machine, and triggering Account Vending Machine using an event bus rule.

14. The method of claim 12, further comprising creating a Google Cloud Platform project by launching a vending process that combines scripts, credentials and variables to create the Google Cloud Platform project.

15. The method of claim 1, further comprising creating a distribution list for notification related to the at least one cloud-based account.

16. The method of claim 1, further comprising configuring logging to be stored in a centralized logging account associated with the at least one cloud-based account.

17. The method of claim 1, further comprising:

determining from role data whether an existing Active Directory group exists relating to the role data;

in response to a determination that an Active Directory group exists for the role data, associating the at least one cloud-based account with the existing Active Directory group; and in response to a determination that an Active Directory does not exist for the role data, creating a created Active Directory group for the at least one cloud-based account according to the role data and associating the at least one cloud-based account with the created Active Directory group.

18. The method of claim 1, further comprising creating and sending a notification that the at least one cloud-based account has been created.

19. The method of claim 1, wherein the security policy update is applied without including a reference to specific cloud-based accounts.

* * * * *